US010623075B2

(12) United States Patent
Pratt et al.

(10) Patent No.: US 10,623,075 B2
(45) Date of Patent: Apr. 14, 2020

(54) LINEAR COMBINATIONS OF TRANSMIT SIGNALS BY A RECEIVER

(71) Applicant: University of Notre Dame du Lac, Notre Dame, IN (US)

(72) Inventors: Thomas G. Pratt, Niles, MI (US); Robert Daniel Kossler, South Bend, IN (US); Jeffrey G. Mueller, South Bend, IN (US)

(73) Assignee: UNIVERSITY OF NOTRE DAME DU LAC, Notre Dame, IN (US)

( * ) Notice: Subject to any disclaimer, the term of this patent is extended or adjusted under 35 U.S.C. 154(b) by 0 days.

(21) Appl. No.: 15/478,179

(22) Filed: Apr. 3, 2017

(65) Prior Publication Data

US 2017/0338874 A1 Nov. 23, 2017

Related U.S. Application Data

(60) Provisional application No. 62/317,497, filed on Apr. 2, 2016.

(51) Int. Cl.
*H04B 7/06* (2006.01)
*H04B 7/08* (2006.01)
*H04B 1/04* (2006.01)
*G01S 7/02* (2006.01)

(52) U.S. Cl.
CPC ......... *H04B 7/0617* (2013.01); *H04B 7/0862* (2013.01); *G01S 7/023* (2013.01); *G01S 7/024* (2013.01); *H04B 2001/0491* (2013.01)

(58) Field of Classification Search
CPC ............... H04B 7/0617; H04B 7/0862; H04B 2001/0491; G01S 7/024; G01S 7/023
See application file for complete search history.

(56) References Cited

U.S. PATENT DOCUMENTS

| 5,235,340 A | * | 8/1993 | Shea | ................... H01Q 21/245 342/188 |
| 6,608,587 B1 | | 8/2003 | Sparrow et al. | |

(Continued)

OTHER PUBLICATIONS

Agilent 8509C Lightwave Polarization Analyzer, Product Overview, Sep. 2002, 1 page.

(Continued)

*Primary Examiner* — Kenneth T Lam
(74) *Attorney, Agent, or Firm* — Knobbe, Martens, Olson & Bear, LLP

(57) ABSTRACT

A multi-port transmitter can synthesize and send a first plurality of transmit signals having a separability characteristic which permits them to be differentiated from one another. A receiver can then detect one or more receiver signals which include one or more combinations of received versions of the first plurality of transmit signals. The receiver may use the separability characteristic to determine the received versions of the first plurality of transmit signals from the one or more receiver signals. Then, the receiver may determine an estimated signal corresponding to the estimated receiver response to a second plurality of virtual transmit signals which comprise a combination of the first plurality of transmit signals. Determining the estimated signal may include forming a combination of the received versions of the first plurality of transmit signals.

35 Claims, 13 Drawing Sheets

(56) References Cited

U.S. PATENT DOCUMENTS

| | | | | |
|---|---|---|---|---|
| 9,037,414 | B1* | 5/2015 | Pratt | G01S 7/024 324/326 |
| 9,325,436 | B2 | 4/2016 | Pratt et al. | |
| 2004/0120274 | A1* | 6/2004 | Petre | H04B 7/04 370/320 |
| 2007/0047678 | A1* | 3/2007 | Sibecas | H04B 1/7115 375/343 |
| 2007/0143036 | A1* | 6/2007 | Stratis | G01N 23/00 702/28 |
| 2010/0003034 | A1* | 1/2010 | Pratt | H04L 27/38 398/152 |
| 2010/0098044 | A1 | 4/2010 | Pratt et al. | |
| 2013/0332115 | A1* | 12/2013 | Pratt | G01N 22/04 702/190 |
| 2014/0169428 | A1 | 6/2014 | Pratt et al. | |
| 2015/0029058 | A1* | 1/2015 | Robey | G01S 11/02 342/458 |
| 2017/0054583 | A1* | 2/2017 | Pratt | H04L 27/2621 |
| 2017/0131335 | A1* | 5/2017 | Pratt | G01R 29/0892 |

OTHER PUBLICATIONS

Agilent 8509C Lightwave Polarization Analyzer, Users Guide/Reference Guide, Mar. 2001, p. 342.

Aldhubaib et al., "Characteristic Polarization States in an Ultrawideband Context Based on the Singularity Expansion Method", IEEE Geoscience and Remote Sensing Letters, vol. 6, No. 4, Oct. 2009, pp. 792-796.

Andresciani et al., "Measurement of the Group-Delay Difference between the Principal States of Polarization on a Low-Birefringence Terrestrial Fiber Cable", Optics Letters, Oct. 1987, vol. 12, No. 10, pp. 844-846.

Anreddy et al., "Capacity of Measured Ricean and Rayleigh Indoor MIMO Channels at 2.4 GHz with Polarization and Spatial Diversity", IEEE Wireless Communications and Networking Conference, vol. 2, Apr. 2006, pp. 946-951.

Anreddy, Vikram R., "Indoor MIMO Channels with Polarization Diversity: Measurements and Performance Analysis", Thesis, Georgia Institute of Technology, May 2006, p. 96.

Asplund et al., "The Cost 259 Directional Channel Model-Part II: Macrocells", IEEE Transactions on Wireless Communications, TR2006-112, vol. 12, No. 5, Dec. 2006.

Azzam et al., "Ellipsometry and Polarized Light", Table of Content Only, North-Holland Personal Library, Elsevier B.V., 1987, p. 13.

Bergano et al., "Investigation of Polarization Dispersion in Long Lengths of Single-Mode Fiber Using Multi-Longitudinal Mode Lasers", Journal of Lightwave Technology, vol. LT-5, No. 11, Nov. 1987, pp. 1618-1622.

Born et al., "Principles of Optics: Electromagnetic Theory of Propagation, Interference and Diffraction of Light", 7th Ed., Cambridge University, 1999, p. 31.

Carin et al., "Polarimetric SAR Imaging of Buried Landmines", IEEE Transactions on Geoscience and Remote Sensing, Nov. 1998, vol. 36, No. 6, pp. 1985-1988.

Catreux et al., "Adaptive Modulation and MIMO Coding for Broadband Wireless Data Networks", IEEE Communications Magazine, Jun. 2002, pp. 108-115.

Chang et al., "Polarization Measurements in a UWB Multipath Channel", IEEE Military Communications Conference, MILCOM 2004, vol. 1, Oct. 2004, pp. 192-196.

Chang, SangHyun, "UWB Polarization Measurements in Multipath Channels", Ph.D. Thesis, University of Southern California, May 2007, p. 135.

Chen et al., "Polarization-Mode Dispersion Measurement in a System with Polarization-Dependent Loss or Gain", IEEE Photonics Technology Letters, Jan. 2004, vol. 16, No. 1, pp. 206-208.

Chevalier et al., "UWB Measurements of Canonical Targets and RCS Determination", Ultra-Wideband, Short-Pulse Electromagnetics 4, 1999, pp. 329-334.

Cho et al., "MIMO-OFDM Wireless Communications with MATLAB", John Wiley & Sons, 2010, p. 457.

Choudhury, Ajit K., "Polarization Characteristics of Resistively Loaded Orthogonal Dipoles Excited by Ultrawideband Signals", 2002 IEEE Conference on Ultra-Wideband Systems and Technologies, Digest of Papers, May 21-23, 2002, pp. 327-331.

Collett, E. "Polarized Light in Fiber Optics", Table of Content Only, Dec. 15, 2003, p. 3.

Compton, R., "On the Performance of a Polarization Sensitive Adaptive Array", IEEE Transactions on Antennas and Propagation, Sep. 1981, vol. AP-29, No. 5, pp. 718-725.

Costa et al., "A Comparison Between Experimentally Observed and Simulated Behaviors of XPD in Frequency-Reuse LOS links", SBT/IEEE International Telecommunications Symposium, Sep. 1990, pp. 217-221.

Degli-Esposti et al., "An Advanced Field Prediction Model Including Diffuse Scattering", IEEE Transactions on Antennas and Propagation, Jul. 2004, vol. 52, No. 7, pp. 1717-1728.

Deschamps et al., "PoincaréSphere Representation of Partially Polarized Fields", IEEE Transactions on Antennas and Propagation, Jul. 1973, vol. AP-21, No. 4, pp. 474-478.

Diaz et al., "PMD Characterization of a Dispersion Managed Link up to the Second-Order with High Accuracy", Optical and Quantum Electronics, 2006, vol. 38, pp. 575-582.

Erceg et al., "Multiple-Input Multiple-Output Fixed Wireless Radio Channel Measurements and Modeling Using Dual-Polarized Antennas at 2.5 GHz", IEEE Transactions on Wireless Communications, vol. 3, No. 6, Nov. 2004, pp. 2288-2298.

EXFO Marketing Material, "Products for Field Network Testing", http://web.archive.org/web/20140929181817/http://www.exfo.com/products/field-network-testing/bu3-optical/dispersion-analysis/ftb-5700 as archived Sep. 29, 2014 in 5 pages.

Eyal et al., "A Modified Poincare Sphere Techniques for the Determination of Polarization-Mode Dispersion in the Presence of Differential Gain/Loss", OFC '98 Technical Digest, ThR1, 1998, p. 340.

Eyal et al., "Characterization and Measurement of the Polarization Properties of Optical Systems in the Presence of PMD and PDL", OFC/NFOEC, Mar. 2005, vol. 4, pp. 734-736.

Eyal et al., "Measurement of Polarization Mode Dispersion in Systems Having Polarization Dependent Loss or Gain", IEEE Photonics Technology Letters, Sep. 1997, vol. 9, No. 9, pp. 1256-1258.

Fong et al., "Polarization of Received Signals for Wideband Wireless Communications in a Heavy Rainfall Region", IEEE Communications Letters, vol. 7, No. 1, Jan. 2003, pp. 13-14.

Frigo, Nicholas J., "A Generalized Geometrical Representation of Coupled Mode Theory", IEEE Journal of Quantum Electronics, Nov. 1986, vol. QE-22, No. 11, pp. 2131-2140.

Fujiwara, Hiroyuki, "Spectroscopic Ellipsometry: Principles and Applications", John Wiley & Sons, Ltd. 2007, p. 388.

Gisin et al., "Combined Effects of Polarization Mode Dispersion and Polarization Dependent Losses in Optical Fibers," Optics Communications, Oct. 1, 1997, vol. 142, pp. 119-125.

Gisin et al., "Polarization Mode Dispersion: Time Versus Frequency Domains", Optics Communications, May 1, 1992, vol. 89, No. 2-4, pp. 316-323.

Gisin, N. "Statistics of Polarization Dependent Losses", Optics Communications, Feb. 15, 1995, vol. 114, pp. 399-405.

Gordon et al., "PMD Fundamentals: Polarization Mode Dispersion in Optical Fibers", PNAS, vol. 97, No. 9, pp. 4541-4550, Apr. 2000.

Guo et al., "Spectrum Sensing for Cognitive Radios Based on Directional Statistics of Polarization Vectors", IEEE Journal on Selected Areas in Communications, Mar. 2013, vol. 31, No. 3, pp. 379-393.

Hansen et al., "Dual Polarized, UWB Radar Measurements of the Sea at 9 GHz" Ultra-Wideband, Short-Pulse Electromagnetics 4, Edited by Heyman et al., Kluwer Academic / Plenum Publishers, New York, 1999, pp. 335-348.

Heffner, B.L., "Automated Measurement of Mode Dispersion Using Jones Matrix Eigenanalysis", IEEE Photonics Technology Letters, Sep. 1992, vol. 4, No. 9, pp. 1066-1069.

(56) References Cited

OTHER PUBLICATIONS

Heffner, B. L., "Accurate, Automated Measurement of Differential Group Delay Dispersion and Principal State Variation Using Jones Matrix Eigenanalysis", IEEE Photonics Technology Letters, vol. 5, No. 7, Jul. 1993, pp. 814-817.
Hinds Instruments, "Technology for Polarization Measurement: Polarimeters and Polarimeter Accessories", http://web.archive.org/web/20170521103708/http://www.hindsinstruments.com/products/polarimeters/, May 21, 2017, p. 1.
Ho et al., "Mode Coupling and its Impact on Spatially Multiplexed Systems", Chapter 11, Optical Fiber Telecommunications, vol. VIB: Systems and Networks, 6th Edition. Editors are I. Kaminow, T. Li, and A. Willner. Academic Press, Walham, Massachusetts, 2013.
Hoefel, Roger Pierre Fabris, "IEEE 802.11n: On Performance of Channel Estimation Schemes over OFDM MIMO Spatially—Correlated Frequency Selective Fading TGN Channels", Brazilian Symposium on Telecommunications, Sep. 13-16, 2012, p. 5.
Van Nee et al., "The 802.11n MIMO-OFDM Standard for Wireless LAN and Beyond", Wireless Personal Communications, 2006, vol. 37, pp. 445-453.
Huttner et al., "Polarization-Induced Distortions in Optical Fiber Networks with Polarization-Mode Dispersion and Polarization-Dependent Losses", IEEE Journal of Selected Topics in Quantum Electronics, vol. 6, No. 2, pp. 317-329, Mar./Apr. 2000.
IEEE 802.11 n-2009, Amendment 5: Enhancements for Higher Throughput, IEEE-SA, Oct. 29, 2009, p. 536.
Jiang et al., "PMD Monitoring in Traffic-Carrying Optical Systems and its Statistical Analysis", Optics Express, Sep. 1, 2008, vol. 16, No. 18, pp. 14057-14063.
Jones, R. Clark, "A New Calculus for the Treatment of Optical Systems. VI. Experimental Determination of the Matrix", Journal of the Optical Society of America, Feb. 1947, vol. 37, No. 2, pp. 110-112.
Jones, R. Clark, "A New Calculus for the Treatment of Optical Systems. VII. Properties of the N-Matrices", Journal of the Optical Society of America, Aug. 1948, vol. 38, No. 8, pp. 671-685.
Kaminow, Ivan P. "Polarization in Optical Fibers", IEEE Journal of Quantum Electronics, Jan. 1981, vol. QE-17, No. 1, pp. 15-22.
Keysight Technologies Lightwave Catalog, "Optical-Electrical, Signal Generation, Complex Modulation Analysis", 2015, vol. II, p. 40.
Koshelev et al., "Investigation of Polarization Structure of Ultrawideband Radiation Pulses", Conference: Pulsed Power Plasma Science, 2001. PPPS-2001. Digest of Technical Papers, vol. 2, p. 4.
Kozono et al., "Base Station Polarization Diversity Reception for Mobile Radio", IEEE Transactions on Vehicular Technology, Nov. 1984, vol. VT-33, No. 4, pp. 301-306.
Kyritsi et al., "Effect of Antenna Polarization on the Capacity of a Multiple Element System in an Indoor Environment", IEEE Journal on Selected Areas in Communications, Aug. 2002, vol. 20, No. 6, pp. 1227-1239.
Kyritsi et al., Propagation Characteristics of Horizontally and Vertically Polarized Electric Fields in an Indoor Environment: Simple Model and Results, IEEE VTS 54th Vehicular Technology Conference in 2001, VTC 2001 Fall, vol. 3, pp. 1422-1426.
Lecoeuche et al., "Non-Intrusive PMD Measurements on Active Fiber Links Using a Novel Coherent Polarization Analyzer", JDSU Marketing Material, http://www.viavisolutions.com/sites/default/files/technical-libraryfiles/nipmd-wp-fop-tm-ae.pdf, Aug. 2012, p. 12.
Lee et al., "Polarization Diversity System for Mobile Radio", IEEE Transactions on Communications, vol. Com-20, No. 5, Oct. 1972, pp. 912-923.
Li et al., "Channel Coupling in Orthogonal Polarisation Diversity Systems and its Influence on Diversity Gain", Electronics Letters, vol. 41, No. 5, Mar. 3, 2005, pp. 225-226.
Li et al., "Solutions to the Dynamical Equation of Polarization-Mode Dispersion and Polarization-Dependent Losses", Journal of the Optical Society of America, vol. 17, No. 11, Nov. 2000, pp. 1821-1827.
Rumney, Moray, "LTE and Evolution to 4G Wireless: Design and Measurement Challenges", Agilent Technologies, 2013, p. 19.
Lui et al., "Polarization Studies in the UWB Radar Target Response using Joint Time Frequency Analysis", Proceedings of the Asia-Pacific Conference on Applied Electromagnetics, Dec. 4-6, 2007, p. 5.
Malik, Wasim Q., "Polarimetric Characterization of Ultrawideband Propagation Channels", IEEE Transactions on Antennas and Propagation, vol. 56, No. 2, Feb. 2008, pp. 532-539.
Mao et al., "A Polarization UWB Receiver with Narrowband Interference Suppression Capability", IEEE Wireless Communications and Networking Conference, Mar. 2007, pp. 1636-1641.
Molisch, Andreas, "Ultrawideband Propagation Channels and Their Impact on System Design", Mitsubishi Electric Research Laboratories, TR2007-099, Aug. 2008, pp. K4-1-K4-5.
Mueller et al., "A Radio Frequency Polarimetric Sensor for Rotating Machine Analysis", IEEE Sensors Journal, vol. 13, No. 12, Dec. 2013, pp. 4866-4873.
Mueller et al., "Comparison of RF Remote Sensing Vibrometry Focusing on Polarization Mode Dispersion", IEEE Sensors Journal, Mar. 15, 2016, vol. 16, No. 6, pp. 1586-1596.
Mueller et al., "Feasibility Study on a Non-contact Remote-sensing Vibration Transducer using RF Polarimetry", IEEE Transactions on Instrumentation and Measurement, vol. 62, No. 11, Nov. 2013, pp. 3073-3086.
Nabar et al., "Performance of Multiantenna Signaling Techniques in the Presence of Polarization Diversity", IEEE Transactions on Signal Processing, vol. 50, No. 10, Oct. 2002, pp. 2553-2562.
Neubauer et al., "Simultaneous Characterization of Polarization Matrix Components in Pico Cells", Electrical Engineering/Electronics, Computer, Communications and Information Technology Association, VTC'99 fall, vol. 3, 1999, pp. 1361-1365.
Nilsson et al., "Measurements of the Spatio-Temporal Polarization Characteristics of a Radio Channel at 1800 MHz", Proceedings IEEE Vehicular Technology Conference, 1999, pp. 386-391.
Olsen, R.L., "Cross Polarization During Clear-Air Conditions on Terrestrial Links: A Review", Radio Science, vol. 16, No. 5, Sep.-Oct. 1981, pp. 631-647.
Oppenheim et al., "Digital Signal Processing", Prentice Hall, New Jersey, PR No. 117, 1975, pp. 75-78.
Optoplex Corporation, "Optical Hybrid Enables Next-Generation Optical Communications", http://www.optoplex.com/download/coherent_detection_and_optical_hybrid.pdf, Feb. 2012, p. 5.
Papazian et al., "Time Variability and Depolarization of the Local Multipoint Distributions Service Radio Channel", IEEE Wireless Communications Conference, 1997, pp. 8-11.
Pereira et al., "An Experimental Evaluation of the Polarization Characteristics of Mobile Communication Signals at 800 MHz", Proceedings of the 2003 SBMO/IEEE MTT-S International Microwave and Optoelectronics Conference—IMOC 2003, Sep. 20-23, 2003, pp. 177-182.
Pérez et al., "Approximate Closed-Form Expression for the Ergodic Capacity of Polarisation-Diversity MIMO Systems", Electronics Letters, Sep. 16, 2004, vol. 40, No. 19, p. 2.
Poole et al., "Dynamical Equation for Polarization Dispersion", Optics Letters, vol. 16, No. 6, Mar. 15, 1991, pp. 372-374.
Poole et al., "Phenomenological Approach to Polarization Dispersion in Long Single-Mode Fibers", Electronics Letters, vol. 22, No. 19, Sep. 11, 1986, pp. 1029-1030.
Poole et al., "Polarization Dispersion and Principal States in a 147-km Undersea Lightwave Cable", Journal of Lightwave Technology, vol. 6, No. 7, Jul. 1988, pp. 1185-1190.
Poole et al., "Polarization-Dependent Pulse Compression and Broadening due to Polarization Dispersion in Dispersion-Shifted Fiber", Optical Fiber Communication, vol. 1 of 1988 OSA Technical Digest Series, Optical Society of America, paper WA2, 1 page.
Pratt et al., "Adaptive Polarization Transmission of OFDM Signals in a Channel with Polarization Mode Dispersion and Polarization Dependent Loss," IEEE Transactions on Wireless Communications, Jul. 2009, vol. 8, No. 7, pp. 3354-3359.
Pratt et al., "Dual-Polarized Architectures for Sensing with Wireless Communications Signals", MILCOM 2008, ACT-7.1, San Diego, CA, Nov. 17, 2008, pp. 1-6.

(56) References Cited

OTHER PUBLICATIONS

Pratt et al., "Input-to-Output Polarization Characterization of Wireless Channels", IEEE Transactions on Antennas and Propagation, Mar. 2019, vol. 67, No. 3, pp. 1804-1818.
Pratt et al., "Polarization-Based Zero Forcing Suppression with Multiple Degrees of Freedom", The 2011 Military Communications Conference—Track 6—Department of Defense Programs, 2011, pp. 2246-2251.
Pratt et al., "Polarization-Based Zero Forcing with Channel Estimation", MILCOM 2011, Baltimore, MD, Nov. 2011, pp. 2252-2257.
Pratt et al., "Towards Efficient Spectrum Utilization with Polarization-Based Architectures", International Journal of Handheld Computing Research (IJHCR), Apr.-Jun. 2015, vol. 6, No. 2, pp. 1-4.
Rappaport et al., "Wide-Band Microwave Propagation Parameters Using Circular and Linear Polarized Antennas for Indoor Wireless Channels", IEEE Transactions on Communications, vol. 40, No. 2, Feb. 1992, pp. 240-245.
Rashleigh et al., "Polarization Mode Dispersion in Single-Mode Fibers," Optics Letters, vol. 3, Issue 2, Aug. 1978, pp. 60-62.
Rashleigh, Scott C., "Origins and Control of Polarization Effects in Single-Mode Fibers", Journal of Lightwave Technology, vol. LT-1, No. 2, Jun. 1983, pp. 312-331.
Reimer et al., "A Clifford Algebra Analysis of Polarization-Mode Dispersion and Polarization-Dependent Loss", IEEE Photonics Technology Letters, vol. 18, No. 6, Mar. 15, 2006, pp. 734-736.
Reimer et al., "Mueller Matrix Description of Polarization Mode Dispersion and Polarization-Dependent Loss", Journal of Optical Society of America A, Jun. 2006, vol. 23, No. 6, pp. 1503-1508.
Rosenfeldt et al., "In-Service Characterization of Optical Links and Signals with Respect to PMD", Proceedings of the SPIE vol. 7621, Paper 762108, Jan. 22, 2010, p. 8.
Sandel et al., "Some Enabling Techniques for Polarization Mode Dispersion Compensation", Journal of Lightwave Technology, vol. 21, No. 5, May 2003, pp. 1198-1210.
Sarytchev et al., "Polarization Structure of Ultra-Wide-Band Radar Signals", Ultra-Wideband, Short-Pulse Electromagnetics 3, Plenum Press, New York, 1997, pp. 477-483.
Shafi et al., "Polarized MIMO Channels in 3-D: Models, Measurements and Mutual Information", IEEE Journal on Selected Areas in Communications, Mar. 2006, vol. 24, No. 3, pp. 514-527.
Shieh, William, "Principal States of Polarization for an Optical Pulse", IEEE Photonics Technology Letters, vol. 11, No. 6, Jun. 1999, pp. 677-679.
Sørensen et al., "Performance of Two-Branch Polarisation Antenna Diversity in an Operational GSM Network", In Proceedings of 48th IEEE VTC, vol. 2, 1998, pp. 741-746.
Stüber Gordon L., "Principles of Mobile Communication", Second Edition, Kluwer Academic Publishers, 2002, p. 768.
Svantesson, Thomas, "A Study of Polarization Diversity Using an Electromagnetic Spatio-Temporal Channel Model", IEEE Vehicular Technology Conference (VTC 2000), vol. 1, No. 52, 2000, pp. 79-86.
Talebi et al., "Reference No. 15: Channel Sounding and Parameter Estimation for a Wideband Correlation-Based MIMO Model", IEEE Transactions on Wireless Communications, Feb. 2015, pp. 25-34.
Talebi, Farzad, "Stochastic Multipath Modeling of Wideband Polarized MIMO Channels", PhD Thesis, University of Notre Dame, Apr. 2015, p. 141.
Talebi, F., "Statistical Modeling of Some Multi-Polarized MIMO Channels: A Narrowband Model", Masters Thesis, University of Notre Dame, Apr. 2012, 1 page.
Teledyne LeCroy "Optical Modulation Analyzer,"Marketing Material for the IQS70 Coherent Modulation Analyzer, as archived Jul. 28, 2015 from https://web.archive.org/web/20150728200657/http://teledynelecroy.com/optical-modulation-analyzer/ in 1 page.
3GPP, "Spatial Channel Model for Multiple Input Multiple Output (MIMO) Simulations", 3GPP TR 25.996, Sep. 2012, p. 2, http://www.3gpp.org/DynaReport/25996.htm.
Van Cappellen et al., "Potentials of Ultra-Short-Pulse Time-Domain Scattering Measurements", IEEE Antennas and Propagation Magazine, vol. 42, No. 4, Aug. 2000, pp. 35-44.
Vaughan, Rodney G., "Polarization Diversity in Mobile Communications", IEEE Transactions on Vehicular Technology, Aug. 1990, vol. 39, No. 3, pp. 177-186.
Walkenhorst et al., "Polarization-Based Interference Mitigation for OFDM Signals in channels with Polarization Mode Dispersion", MILCOM 08, MCS-12.2, San Diego, CA, Nov. 17, 2008, p. 5.
Wiesbeck et al., "Basic Properties and Design Principles of UWB Antennas", Proceedings of the IEEE, vol. 97, No. 2, Feb. 2009, pp. 372-385.
Weichselberger et al., "A Stochastic MIMO Channel Model With Joint Correlation of Both Link Ends", IEEE Transactions on Wireless Communications, Jan. 2006, vol. 5, No. 1, pp. 90-100.
West et al., "Multipath EM Scattering from Breaking Ocean Waves at Grazing Incidence", Radio Science, vol. 32, No. 4, Jul.-Aug. 1997, pp. 1455-1467.
Wu et al., "Channel Coding for Wireless Communication via Electromagnetic Polarization", 2016 IEEE International Symposium on Information Theory (ISIT'16.), 2016, pp. 2943-2947.
Yariv, Amnon, "Coupled-Mode Theory for Guided-Wave Optics", IEEE Journal of Quantum Electronics, vol. QE-9, No. 9, Sep. 1973, pp. 919-933.
Yin et al., "Polarization Estimation of Individual Propagation Paths Using the SAGE Algorithm", 14th IEEE Proceedings on Personal, Indoor and Mobile Radio Communications, 2003, pp. 1795-1799.
Yu et al., "Modeling of Wideband MIMO Radio Channels Based on NLOS Indoor Measurements", IEEE Transactions on Vehicular Technology, May 2004, vol. 53, No. 3, pp. 655-665.
Zajić et al., "Wide-band MIMO Mobile-to-Mobile Channels: Geometry-Based Statistical Modeling with Experimental Verification", IEEE Transactions on Vehicular Technology, vol. 58, No. 2, Feb. 2009, p. 17.
Zhou et al., "Probability of Error and Capacity of Multipolarization Antenna Systems for Downlink Mobile Communications", IEEE Transactions on Vehicular Technology, vol. 55, No. 1, Jan. 2006, pp. 256-269.
Zhou et al., "Virtual Channel Space-Time Processing With Dual-Polarization Discrete Lens Antenna Arrays", IEEE Transactions on Antennas and Propagation, vol. 53, No. 8, Aug. 2005, pp. 2444-2455.

* cited by examiner

LINEAR COMBINATIONS OF TRANSMIT SIGNALS BY A RECEIVER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, this application claims priority to U.S. Provisional Patent Application 62/317,497, filed Apr. 2, 2016, and entitled "COHERENT SIGNAL LINEAR COMBINING METHOD AND APPARATUS," the entirety of which is incorporated herein by reference.

STATEMENT REGARDING FEDERALLY SPONSORED R&D

This invention was made with government support under Funds 201982 and 202326 of the U.S. Office of Naval Research. The government has certain rights in the invention.

BACKGROUND

Field

This disclosure relates generally to systems and methods for processing signals transmitted between a transmitter and a receiver.

Description of the Related Art

One topic related to this disclosure is polarization. Polarization is a characteristic of electromagnetic or other transverse waves which specifies the direction in which the waves oscillate in a transverse plane orthogonal to the direction of propagation. This direction of oscillation can be thought of as being made up of two orthogonal components. If the two orthogonal polarization components of a wave oscillate in phase with one another, they collectively result in a wave that oscillates linearly (i.e., along a line in the transverse plane). If there is a phase difference between the oscillations of the two orthogonal polarization components, they collectively result in a wave whose oscillations follow an ellipse in the transverse plane. In the case where the phase difference is ±90°, and assuming the amplitudes of the orthogonal components are identical, then the two polarization components collectively result in a wave whose oscillations follow a circle in the transverse plane. A transmitter can control the polarization state of a wave by varying the phase difference and relative amplitude between signals emitted from orthogonally polarized antenna elements.

Another topic related to this disclosure is beamforming. Beamforming is a technique used in multi-port transmitters and receivers to transmit or receive signals with directional selectivity. For example, a transmitter can employ beamforming to transmit a signal in a selected direction preferentially over other directions. Similarly, a receiver can employ beamforming so as to be more sensitive to signals arriving from a selected direction.

Beamforming is accomplished by introducing phase differences between signals emitted or received by spatially-separated antenna elements. The phasing can occur at radio frequencies (RF), such as in analog arrays, or digitally, such as in digital beam forming systems. These phase differences cause the waves of energy which carry the signals to combine constructively and destructively interfere differently along different angles of transmission or reception. In directions where the waves constructively interfere with one another, the signal is stronger, whereas in directions where the waves destructively interfere with one another, the signal is weaker. A transmitter can control the direction of heightened signal power by varying the phase differences between signals emitted from spatially-separated antenna elements. Similarly, a receiver can control the direction of heightened sensitivity by varying the phase differences between signals received at spatially-separated antenna elements.

SUMMARY

In some embodiments, a method comprises: synthesizing a first plurality of transmit signals having a separability characteristic which permits them to be differentiated from one another; transmitting the first plurality of transmit signals using a multi-port transmitter; receiving one or more receiver signals using a receiver, the one or more receiver signals comprising one or more combinations of received versions of the first plurality of transmit signals; using the separability characteristic to determine the received versions of the first plurality of transmit signals from the one or more receiver signals; and determining, using the receiver, an estimated signal corresponding to the estimated receiver response to a second plurality of virtual transmit signals which comprise a combination of the first plurality of transmit signals, wherein determining the estimated signal comprises forming a combination of the received versions of the first plurality of transmit signals.

In some embodiments, a system comprises: a multi-port transmitter configured to coherently transmit a first plurality of transmit signals having a separability characteristic which permits them to be differentiated from one another; and a receiver configured to: receive one or more receiver signals; determine received versions of the first plurality of transmit signals from the one or more receiver signals using the separability characteristic; and determine an estimated signal corresponding to the estimated receiver response to a second plurality of virtual transmit signals which comprise a combination of the first plurality of transmit signals, wherein determining the estimated signal comprises forming a combination of the received versions of the first plurality of transmit signals.

In some embodiments, a receiver comprises: one or more input ports to receive one or more receiver signals which include receiver responses to a first plurality of transmit signals from a transmitter, the first plurality of transmit signals having a separability characteristic which permits them to be differentiated from one another; and a signal processor configured to: determine received versions of the first plurality of transmit signals from the one or more receiver signals using the separability characteristic; and determine an estimated signal corresponding to the estimated receiver response to a second plurality of virtual transmit signals which comprise a combination of the first plurality of transmit signals, wherein determining the estimated signal comprises forming a combination of the received versions of the first plurality of transmit signals.

DETAILED DESCRIPTION

Overview

Figure 1:
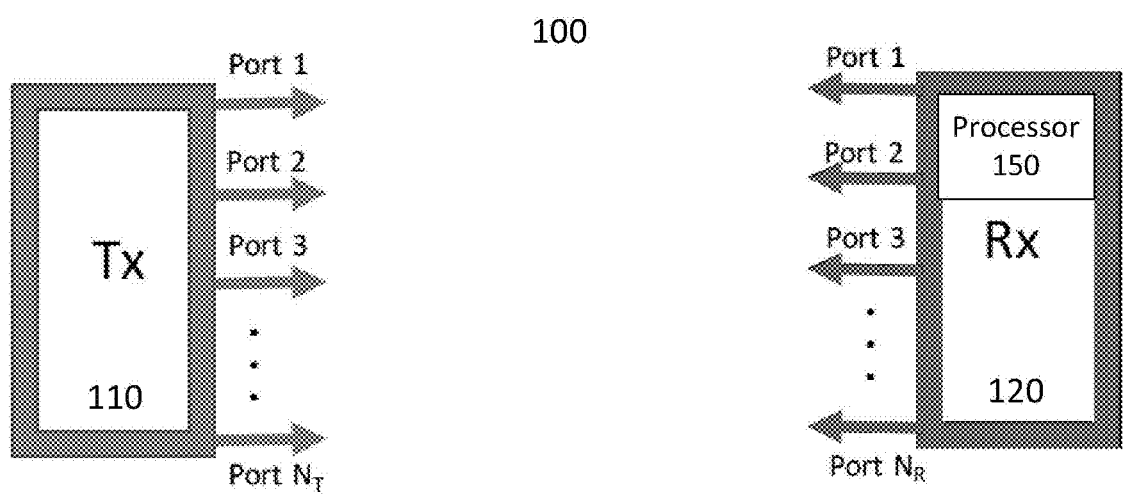
FIG. 1 illustrates a block diagram of a transmitter-receiver system.

Systems and methods are described herein for using receiver-side signal processing of receiver responses to coherent, separable transmit signals to achieve a variety of functions. The separable transmit signals can have any relative amplitude and/or phase differences with respect to one another, which may result in, for example, a particular polarization state and/or beam state (e.g., a particular beam shape and/or beam steering direction). The receiver responses to the separable transmit signals (which may include the effects of channel impairments) can be separated by the receiver and then used to estimate the receiver responses to transmit signals having any different arbitrary relative amplitude and/or phase differences. This allows the receiver to simulate, for example, transmit beamforming or control of transmit polarization via signal processing at the receiver.

According to some embodiments, a multi-port transmitter can coherently send multiple separable transmit signals to a receiver. The transmit signals can have any relative amplitude and/or phase differences between them. Some of the transmit signals may have an associated polarization state related to the relative phase difference between two transmit signals which are transmitted from orthogonally-polarized antenna elements. In addition, some of the transmit signals may have an associated beam state (e.g., beam shape and/or beam steering direction) related to the relative phase differences between multiple transmit signals which are transmitted from spatially-separated antenna elements. The transmit signals propagate via one or more channels to the receiver where they are collectively detected.

The receiver may be a single-port receiver or a multi-port receiver. In either case, each receiver port may detect multiple transmit signals. Thus, the received signal at any given receiver port may consist of the receiver responses to multiple transmit signals. These receiver responses to the transmit signals may include the effects of impairments of the channel(s) between the transmitter and the receiver. Conventionally, the receiver may have no way of identifying the individual responses to the transmit signals and may have no access to them. But, according to the systems and methods described herein, the transmit signals can advantageously be synthesized in a manner such that they are mutually coherent and separable at the receiver. For example, the transmit signals may have one or more separability characteristics that allow the receiver to identify, isolate, and/or distinguish the receiver responses to the transmit signals from one another. This can permit the receiver to separate the received versions of the transmit signals and perform additional processing discussed herein.

Since the received signal at any of the receiver ports may include portions of the receiver responses to multiple transmit signals, a signal processor can be used to process the received signal(s) to identify, isolate, and/or distinguish the received versions of the separable transmit signals. This can be done, for example, by utilizing the separability characteristic of the transmit signals to separate the various received versions of the transmit signals from within those signals which are detected at one or more receiver ports.

Once the received versions of the transmit signals (which generally include the effects of channel impairments) have been separated, the receiver can perform additional signal processing to estimate or simulate signals which correspond to those which would have been received if the transmit signals had been transmitted with a different relative amplitude and/or phasing between the transmitter ports (e.g., a different polarization state and/or a different beam state). In other words, the estimated signal which is calculated by the receiver may be the estimated receiver response due to a set of virtual transmit signals. This receiver-side processing can include weighted coherent combining of the received versions of the separable transmit signals, where the weights may be complex values that scale and phase shift the receiver responses to the transmit signals. In some embodiments, selection algorithms, such as optimization-type algorithms, can be employed to select combining weights which result in an estimated signal having a desired feature or characteristic (e.g., improved signal power, improved signal-to-noise ratio, a desired polarization mode dispersion profile, signal suppression, etc.) The specific algorithm can be chosen depending upon the scheme to be implemented. In addition, the receiver-side processing can also include complex weighted combining of the various received signals themselves (e.g., the signals received at the different ports in a multi-port receiver).

Receiver-side linear combining of the received versions of the transmit signals can be used to accomplish a number of useful purposes that previously could only be accomplished from the transmitter side of the system. By coherently transmitting separable signals at the transmitter, and coherently receiving signals at the receiver, the phase relationships between the transmit signals and between the received signals can be maintained. This helps permit the received versions of the separated transmit signals to be combined at the receiver to estimate or simulate the effect of any relative complex scaling (including phase shifting) between the transmit signals. For example, receiver-side combining techniques can be applied to achieve the simulated effect of digital beamforming at the transmitter, where an arbitrary transmit beam direction can be considered simply by forming the appropriate weighted combination of the received versions of the transmit signals. In other words, simulated transmit beamforming may be achieved via signal processing at the receiver. Of course, receive beamforming can also be implemented via signal processing at the receiver.

Another example of receiver-side combining of the received versions of the transmit signals is associated with polarization control. In some embodiments, the effect of different polarization state(s) of the transmit signals can be estimated or simulated through signal processing at the receiver using weighted combining performed on the received and separated versions of the transmit signals. In other words, simulated polarization control of the transmit signals can be achieved through receiver-side signal processing.

Yet another example involves weighted combining of the received versions of the transmit signals to achieve interference suppression. In this case, combining weights at the receiver can be adjusted to achieve both a transmit null (using received versions of separated transmit signals associated with multiple transmitter ports) and a receive null (using received signals from multiple receiver ports). Different nulling algorithms are possible, including zero forcing (to reduce or minimize the interference without regard to the impact on the desired signal) and minimum mean square error (to improve or optimize the signal-to-interference-plus-noise power ratio).

Any of the combining techniques discussed herein may be applied to each sub-band (of the received versions of the transmit signals or the received signals themselves) independently. The coherent, separable transmission scheme described herein, with or without accompanying coherent reception, represents a new capability that has potential applications in, for example, radar, communications, and remote sensing.

Some example applications of the systems and methods described herein include the following:

Bistatic Measurements: An example application of the techniques described herein is an approach for conducting bistatic sensing, where both transmitter-side and receiver-side beams and/or polarizations are controlled by receiver-side signal processing. A single set of actual measurements (i.e., made using signals received at the receiver) can be used to obtain estimated or simulated characterizations for a wide range of both transmitter-side and receiver-side beam positions and polarizations. This may be contrasted with an approach that requires physical transmitter-side beamforming for each transmitter beam state that is to be investigated, or physical transmitter-side polarization control for each polarization state that is to be investigated. Unlike the improved techniques described herein, those transmitter-side approaches require independent physical measurements for each condition that is to be investigated.

Spectrum sharing via coherent multiple-input and multiple-output (MIMO) communications: Another application involves spectrum sharing applications, where coherent, separable transmissions enable a receiver to suppress unwanted co-channel signals using weighted combining techniques at the receiver. This can be accomplished, for example, by identifying a weighted combination of the received versions of the transmit signals which results in suppression of the unwanted co-channel signal at a specified receiver or receiver port. Even if a receiver only has a single port, the separability characteristic of the transmit signals facilitates suppression of the unwanted signal by the receiver through weighted combinations of the received versions of the separated, coherent transmit signals.

Radar Processing: Coherent, separable transmit signals facilitate adaptive transmission processing and adaptive receiver processing, as a function of sub-bands or range gates, that are both controlled on the receiver side and are accomplished through signal processing.

The coherent signals at each antenna port of the transmitter and/or the receiver can be combined in a weighted fashion, leading to capabilities such as interference avoidance, interference suppression, beamforming, and signal power maximization, all on a sub-band-by-sub-band basis. The techniques may be applied using transmitters and receivers whose ports are each associated with a dedicated antenna element, using phased array systems, using beams formed from a complex weighted combination of antenna elements, using antennas pointed in different directions, or using analogous types of systems.

The techniques described herein can be used with a variety of coherent multi-port transmitters and receivers, such as dual-polarized transmitter systems, beamforming systems, sectored systems, space-polarization architectures, and massive MIMO systems. Through appropriate waveform designs, the signals from a transmitter, when received at any port of a receiver, can be separated with sufficiently little mutual interference to accomplish the types of processing described herein. The receiver may then form weighted combinations of the separated signals to achieve various desired effects. For example, the methods may be employed to achieve benefits similar to those of adaptive transmission techniques, such as transmitter signal suppression or nulling for interference avoidance, SNR improvement or maximization, and reduced (or zero) dispersion after propagation through the channel, but where the effects are controlled at the receiver by taking advantage of access to the separable, transmit signals. Additionally, these responses can be combined with weighted combining across the receive antenna ports to achieve adaptive receive capabilities as well.

System Description

FIG. 1 illustrates a block diagram of a transmitter-receiver system 100 which can be used to perform the signal processing techniques described herein. For example, the system 100 can use receiver-side signal processing of transmit signals having particular amplitude and/or phase differences (e.g., transmit signals associated with a particular polarization state and/or beam state) to estimate the receiver responses to transmit signals any other arbitrary amplitude and/or phase differences (e.g., transmit signals associated with any other arbitrary polarization state and/or beam state). The system 100 includes a transmitter 110 and a receiver 120. The transmitter 110 may be a multi-port system with transmit ports Tx Port 1, Tx Port 2, Tx Port 3, . . . , Tx Port $N_T$, which are used for signal transmission. Each of the transmit ports may be connected to a corresponding transmit antenna element. Some of the transmit antenna elements can be co-located and can have orthogonal polarizations (e.g., vertical and horizontal polarizations). Some of the transmit antenna elements can be spatially-separated, usually, but not necessarily, by at least one half wavelength of an RF carrier frequency used by the transmitter 110.

The transmit signals can be coherently synthesized by the transmitter 110. This may relate to the usage of a consistent phase reference and/or the setting and preservation of a particular phase relationship among signals, and/or sub-bands of those signals. In some embodiments, the transmit signals may be synthesized from a common transmit waveform. In some embodiments, the transmit signals are scaled, phase-shifted, time delayed, and/or frequency-shifted versions of one another. In addition, the transmit signals can be synthesized in a manner such that they are separable at the receiver 120. As already mentioned, this can be accomplished by providing the transmit signals with one or more separability characteristics that allow the receiver 120 to identify, isolate, and/or distinguish the transmit signals from one another at the receiver 120. For example, the transmit signals can be designed to be approximately orthogonal in some sense so that the transmit signals can be separated at the receiver with little or no crosstalk. Effective orthogonalization techniques include time-multiplexing, frequency multiplexing, code multiplexing, beam multiplexing, eigenmode multiplexing, or other techniques enabling separation.

In the case where $N_T=2$ in FIG. 1, the two Tx ports of the transmitter 110 may be connected to a dual polarized antenna. In such a case, the transmitter 110 can vary the transmitted polarization state by varying the phase difference between the signals outputted via the two orthogonally-polarized Tx ports. This can be accomplished by applying different complex weights to the transmit signals outputted from the two Tx ports. The transmitter 110 may transmit any of a plurality of polarization states PS1, PS2, PS3, . . . , PSN. The transmitted polarization state may vary by frequency such that the polarization state is different for different frequency sub-bands of the transmitted signals.

When $N_T \geq 2$ in FIG. 1, the transmitter ports may be connected to spatially-separated antennas. In such cases, the transmitter 110 can use beamforming techniques to transmit different beam states (e.g., beam shapes and/or beam steering directions). The transmitter 110 can vary the transmitted beam state by varying the scaling and/or phase differences between the signals outputted via the spatially-separated Tx ports. This can be accomplished by applying different complex weights to the signals outputted from the Tx ports. The transmitter 110 may transmit any of a plurality of beam states BS1, BS2, BS3, . . . , BSN, where each of these beam states corresponds to a different beam shape and/or beam steering direction.

In addition, the transmitter 110 can send transmit signals associated with any other coherent signal states, where the transmit signals have any relative amplitude and/or phase differences and are emitted as any complex weighted combination from the transmitter ports. For any coherent signal state, however, the transmit signals can be synthesized to be separable at the receiver.

The coherent, separable transmit signals can be sent by the transmitter 110 to the receiver 120 via one or more channels. The channel(s) may have one or more characteristics which cause the separable transmit signals to be modified as they propagate through the channel(s). For example, the channel(s) may be frequency dependent channels, multipath channels, etc. Thus, the versions of the transmit signals which arrive at the receiver may be partially dependent upon the channel(s). Accordingly, the estimated signals which are calculated according to the techniques described herein may provide information about the channel(s)

In some embodiments, the receiver 120 has a single receive port. In other embodiments, the receiver 120 is a multi-port system with receive ports Rx Port 1, Rx Port 2, Rx Port 3, . . . , Rx Port $N_R$, which are used for signal reception. In the case of a multi-port architecture, the receiver 120 may coherently receive signals using multiple antenna elements. Phase information can be preserved between the various received signals.

In general, the received signal at each of these receiver ports may include portions of multiple different transmit signals. For example, the received signal at Rx Port 1 may include versions of the transmit signals sent from each of Tx Port 1, Tx Port 2, Tx Port 3, . . . , Tx Port $N_T$. The same may also be true of each of the other receive ports. But a signal processor 150 can be used to process the received signal(s) to identify, distinguish, and/or extract the received versions of the separable transmit signals from within those signals which are detected at one or more receiver ports. The signal processor 150 can also implement various other processing tasks described herein, such as forming combinations of the received versions of the transmit signals. In some embodiments, the signal processor of the receiver 120 is a local processor. In other embodiments, the signal processor may be located remotely or it may be a distributed system made up of processors located in multiple locations.

The system 100 can be operated in a bistatic fashion with the transmitter 110 and the receiver 120 not being co-located. Alternatively, the system 100 can be operated in a monostatic fashion, where the transmitter 110 and the receiver 120 are co-located, or approximately co-located. In some monostatic configurations, each antenna can be used by both a transmitter port and a receiver port. For these cases, to improve isolation between the transmitter 110 and the receiver 120 when operating simultaneously, a circulator or other circuit can be used to mitigate the impact of transmissions on the receiver.

The transmitter 110 may include an arbitrary number of spatially-separated antennas, and each of those could be dual polarized to provide two Tx ports each. Further, the system illustrated in FIG. 1 could include an arbitrary number of spatially-separated receiver antennas. And each of those could be dual polarized to provide two ports each. In addition, tri-polarized antennas could be used by the transmitter 110 and/or the receiver 120, leading to an additional port for each antenna, so as to allow for the transmission or reception of waves from any direction. Additionally, a large number of antennas could be employed, as in massive MIMO configuration.

In some embodiments, each transmit signal corresponds to the output of one Tx port. Similarly, each receiver signal may correspond to the input of one Rx port. However, instead of employing transmit/receive ports as the fundamental quantity, a transmit signal or a receiver signal can instead be associated with a beam derived from a complex weighted combination of ports. In other words, it is not required that each transmit signal correspond only to what is sent via a single antenna element or that each receiver signal correspond only to what is received via a single antenna element. Instead, signals can be transmitted and received as different complex weighted combinations of the ports. For example, a transmit signal may consist of scaled, phase-shifted outputs from multiple antenna elements. Similarly, a receiver signal may consist of scaled, phase-shifted inputs from multiple antenna elements. These complex weighted combinations can be frequency dependent (e.g., the weighted combination may be different for different frequency sub-bands). For spatially-separated antenna elements, frequency-dependent complex weights would generally correspond to different beam states (e.g., different beam shapes and/or beam steering directions) as a function of frequency. For a dual polarized antenna, frequency-dependent complex value weights would generally correspond to different polarization states as a function of frequency. For an antenna system with both spatially-separated and polarized antenna elements (i.e., a space-polarization architecture), a transmit signal or a receiver signal may consist of a complex weighted combination involving beam states and polarization states.

In some embodiments, the transmit signals and the received signals are electromagnetic signals, such as radio frequency (RF) signals. However, the same techniques can be implemented using signals carried by various other types of electromagnetic radiation such as infrared, visible light, ultraviolet, or x-ray signals. In addition, transmitting and/or receiving elements other than antennas can be used, depending upon the type of energy used to convey the signals between the transmitter and receiver. Thus, the systems described herein can be adapted to operate using different types of signals.

Figure 2:
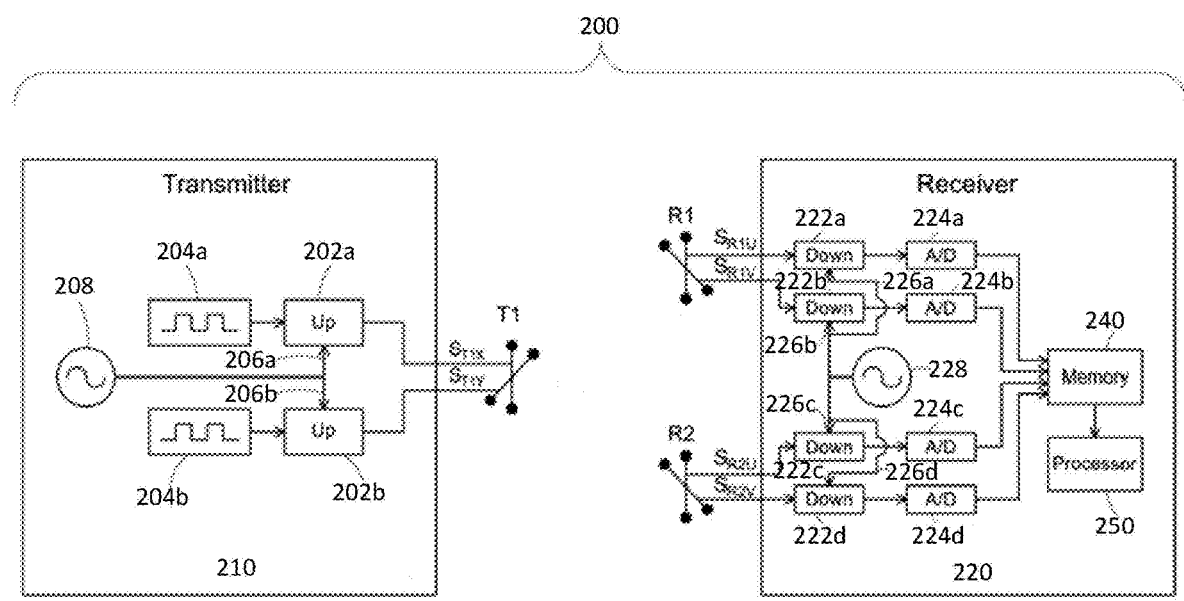
FIG. 2 illustrates a more detailed block diagram of an example transmitter-receiver system.

FIG. 2 illustrates a more detailed block diagram of an example transmitter-receiver system 200 according to FIG. 1. The system 200 includes a transmitter 210 and a receiver 220. In this example, $N_T$ equals 2 and the transmitter 210 has a transmitting antenna T1 with orthogonally-polarized antenna elements. (Although the system 200 is illustrated with co-located orthogonally-polarized transmitting antenna elements, multiple spatially-separated transmitting antenna elements could also be used.) The dual polarized transmitting antenna T1 is x-polarized and y-polarized, where x and y represent any pair of orthogonal polarizations, including vertical and horizontal, right and left-hand circular, slant +45° and slant −45°, etc.

Further, in the example of the FIG. 1 system 100 which is shown in FIG. 2, $N_R$ equals 4 and the receiver 220 is connected to two spatially-separated receiving antennas R1, R2, each having two orthogonally-polarized antenna elements. In some embodiments, the receiving antennas R1, R2 are typically separated by at least one half wavelength of the RF carrier frequency used by the transmitter 210. The first dual polarized receiving antenna R1 is u-polarized and v-polarized, where u and v represent any pair of orthogonal polarizations, including vertical and horizontal, right and left-hand circular, slant +45° and slant −45°, etc. In some embodiments, either the u- or v-polarization is co-polarized with the x- or y-polarization of the transmitting antenna T1, but this is not required. In some embodiments, the second dual polarized receiving antenna R2 is also u-polarized and v-polarized. However, in other embodiments, the orthogonal polarizations of the second receiving antenna R2 can be different than those of the first receiving antenna R1.

The transmitter 210 includes waveform generators 204a, 204b that can respectively provide baseband waveforms $S_{T1x}$ and $S_{T1y}$ that are coherently synthesized with a desired phase relationship (e.g., a phase difference designed to achieve a particular polarization state). In some embodiments, the shapes of the waveforms for the transmit signals are substantially similar or identical, but the signals are scaled with relative amplitude and/or relative phase with respect to one another. Also, the transmit signals may be transmitted via different antenna elements, via different transmission beams, with different time delays, or with different frequency offsets. Although only two waveform generators are illustrated, any number of waveform generators could be included depending upon, for example, the number of transmit ports. In addition, for transmitters which are coupled to spatially-separated antenna elements, the waveform generators may coherently synthesize transmit signals with desired phase relationships to achieve a particular beam state.

The waveform generators 204a, 204b can provide any of the following waveforms: single tone continuous wave, wideband noise, band-limited noise, chirp, stepped frequency, multi-tone, pulses, pulsed chirps, orthogonal frequency division multiplexing (OFDM), binary phase shift keying (BPSK), linear FM on pulse (LFMOP), etc. It should be understood, however, that these are just example waveforms and that a wide variety of other waveforms can also be used, including any desired arbitrary waveform that may be suited to a given application. Each of the waveform generators 204a, 204b can operate independently and can provide different waveforms at any given time. In some embodiments, the transmit signals can be scaled and/or phase-shifted versions of one another. For example, when using a dual-polarized transmit antenna, controlling the relative phase and amplitude between the orthogonally-polarized antenna elements leads to control over the transmitted polarization state. Similarly, when using spatially-separated transmit antenna elements, controlling the relative phase and amplitude between antenna elements leads to control over the transmitted beam state.

The baseband waveforms produced by the waveform generators 204a, 204b can be provided to up-converters 202a, 202b to be shifted to an RF carrier frequency $f_0$. The RF carrier frequency is provided by the local oscillator 208. One way to help achieve coherency between the transmit signals is to share a common local oscillator 208 used in the up-conversion processing. A common local oscillator can be advantageous in a multichannel transmitter because any impairments in the local oscillator 208 may affect all channels relatively equally, thus not substantially affecting relative channel-to-channel comparisons. In some instances, control over the local oscillator phase may be advantageous, for example to assure that the starting phase reference for each transmit signal is substantially identical (or if not identical then known so that the phase difference between transmit signals can be compensated). The carrier frequency is fed from the local oscillator 208 to the up-converters 202a, 202b via signal lines 206a, 206b. In some embodiments, the signal lines 206a, 206b are matched signal lines so as to maintain the phase coherency of the carrier frequency at the up-converters 202a, 202b. As shown in FIG. 2, a single local oscillator 208 can feed both up-converters 202a, 202b. Alternatively, different local oscillators can respectively feed the up-converters 202a, 202b. But, if different local oscillators are used, they are preferably synchronized in phase and frequency.

FIG. 2 illustrates one system for synthesizing transmit signals, but others can also be used. For example, the transmitter 210 can transmit a signal consisting of two or more coherent continuous-wave or pulsed (or otherwise modulated) RF tones. Or two or more coherent signals can be directly generated using digital signal processing followed by digital-to-analog conversion. Other methods of coherent signal generation are also possible.

In some embodiments, each signal channel in the transmitter 210 can be substantially phase and gain matched with the others. In order to achieve this matching, compensation circuits can be included. For example, if the transmitter 210 includes different amplifier circuits in each channel, then depending upon the transmit signal and the non-linear behavior of the amplifier in each channel, it may be possible for asymmetrical signal distortion to occur (e.g., the effects on one channel are not identical to the other channels). Such behavior could be detrimental to a coherent, matched system, and so compensation circuits can be used to reduce or minimize undesired phase and gain mismatches in the signal channels.

As just discussed, in some embodiments the transmitter 210 is designed such that desired phase relationships can be set and preserved between the various transmit signals. In some embodiments, the transmitter 210 can advantageously achieve precise control of the phase, amplitude, sampling, and frequency among the various generated signals used at the transmitter. Further, in some embodiments, the phase noise of the local oscillator 208 is negligible such that energy of a desired signal in one sub-band coupling to an adjacent sub-band is significantly less (e.g., two or more orders of magnitude less) than the signal being detected in that adjacent band.

In addition, the transmit signals $S_{T1x}$ and $S_{T1y}$ may advantageously be separable. This means that the transmit signals $S_{T1x}$ and $S_{T1y}$ have a separability characteristic that can be used by the receiver 220 to distinguish one transmit signal from another. (If additional transmit signals are used, they, too, may be separable.) Again, the different signals generated at the transmitter 210 may be approximately orthogonal in some sense so that the signals can be separated at the receiver 220 with little crosstalk among the signals. The separability property of the transmit signals can be achieved in several different ways, including, for example, through the use of time division multiplexing, frequency division multiplexing, code division multiplexing, and/or beam multiplexing. Methods based on eigendecomposition or singular value decomposition can also be used. Other methods may also be possible.

Figure 3:
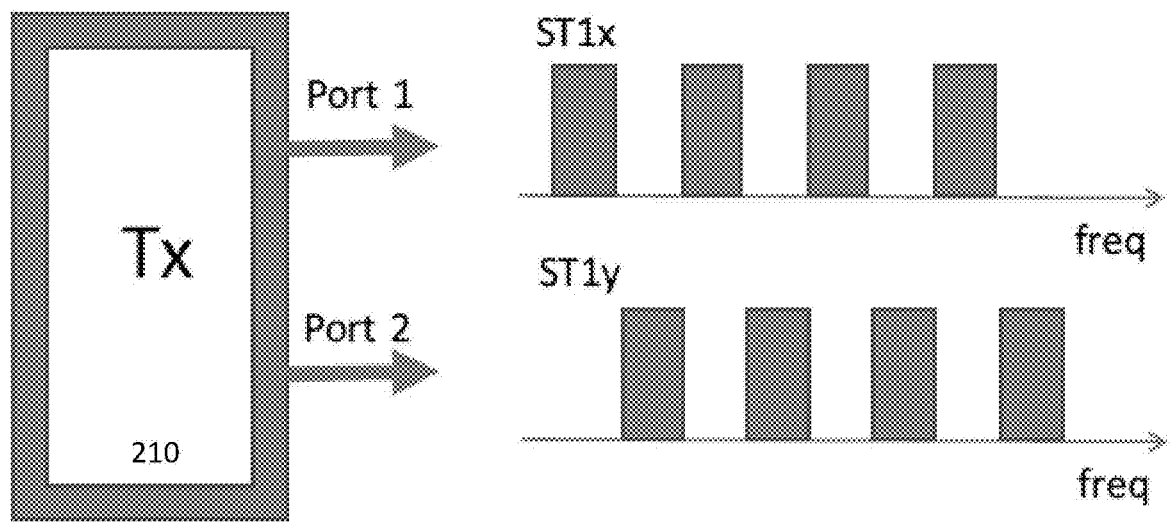
FIG. 3 illustrates examples of two separable transmit signals in the frequency domain.

In the case of time division multiplexing, the signals $S_{T1x}$ and $S_{T1y}$ can be transmitted during different time slots such that the receiver 220 can distinguish the response of each of the receiving antennas to each of the transmit signals. However, in some cases it may be advantageous for the signals to partially or fully overlap in time. In cases where it is desirable that the signals $S_{T1x}$ and $S_{T1y}$ be transmitted at the same time (or at time periods which overlap), then frequency division multiplexing, code division multiplexing, beam multiplexing, eigendecomposition, singular value decomposition, and/or other methods can be used. Frequency multiplexing involves the use of different frequency sub-bands to achieve separability, as shown in FIG. 3. Beam multiplexing involves the use of different beam steering directions to achieve separability. Code multiplexing involves the use of codes, such as orthogonal codes to achieve separability.

FIG. 3 illustrates two separable transmit signals $S_{T1x}$, $S_{T1y}$ which can be used in the system 200 shown in FIG. 2. In the illustrated example, the two transmit signals are separable based on frequency division multiplexing. FIG. 3 shows an abstract representation of the transmitted signals $S_{T1x}$ and $S_{T1y}$ in the frequency domain. The bandwidth (BW) of the signals $S_{T1x}$ and $S_{T1y}$ is shown as being separated into 8 segments. The shaded regions indicate the frequency bands utilized by each signal. As illustrated, in this case $S_{T1x}$ utilizes the odd frequency sub-bands (i.e., frequency sub-bands 1, 3, 5, and 7). Meanwhile, $S_{T1y}$ utilizes the even frequency sub-bands (i.e., frequency sub-bands 2, 4, 6, and 8). Because the signals $S_{T1x}$ and $S_{T1y}$ do not overlap in frequency, the responses to these transmitted signals at the receiving antennas can be separately determined despite the fact that the signals may be transmitted at the same time. In embodiments with a greater number of transmit signals, a similar frequency-interleaved approach can be used where each transmit signal uses every Nth sub-band, where N is the number of transmit signals.

After separating the transmit signals based on frequency sub-bands, it may be desirable to interpolate the results for any missing sub-bands of interest. For example, interpolation can be used to fill in the even sub-bands for $S_{T1x}$ and the odd sub-bands for $S_{T1y}$. The sub-band spacing may be designed so that the channel transfer function does not change appreciably between sub-bands. Linear interpolation, spline smoothing, or other appropriate methods may be employed to compute any missing sub-band values.

This separability property of the transmitted signals $S_{T1x}$ and $S_{T1y}$ allows for significant advantages, as described herein. It should be understood that FIG. 3 illustrates just one idealized example of a frequency division multiplexing scheme. Many others can be used. Further, although code division multiplexing is not illustrated, it too can be used to transmit separable signals at the same or overlapping times.

The transmitter 210 transmits the separable baseband signals $S_{T1x}$ and $S_{T1y}$, up-converted to the RF carrier frequency, via the antenna T1. The $S_{T1x}$ signal is transmitted via the x-polarized component of the transmitting antenna T1, while the $S_{T1y}$ signal is transmitted via the y-polarized component of the transmitting antenna. (It is also possible that the signals can be transmitted using different weighted combinations of the x- and y-polarization modes.)

The receiver 220 can down-convert the received signals and perform analog-to-digital conversion. This is done using the down-converters 222a-d and the analog-to-digital converters 224a-d. Each of these components can be connected to, and controlled by, a common local oscillator 228 and/or clock signal (as applicable depending upon the circuitry) in order to maintain consistent phase and/or timing references. For example, the received signals can be down-converted using a consistent phase reference and the analog-to-digital converters can take synchronous samples. This helps to ensure that relative phase information between the received signals is preserved in the digitized signals. In addition, the signal lines 226a-d from the local oscillator 528 to the various components can be matched so as to further help maintain phase coherency in the receiver. Although FIG. 2 illustrates a single local oscillator 228, multiple oscillators can be used if they are synchronized. The digital signals that are output from the analog-to-digital converters 224a-d can be saved in a memory 240 and sent to a signal processor 250 for analysis. Though not illustrated, the receiver 220 can also include signal conditioning circuitry, such as amplifiers, filters, etc. In addition, the receiver 220 could include an intermediate frequency (IF) processing stage.

Part of the processing that can be performed by the receiver 220 is separating the signal responses at each of the four receiver antenna inputs which are attributable to each of the transmit signals $S_{T1x}$ and $S_{T1y}$. For example, the response at the u-polarization component of the first receiver antenna R1 will, in general, consist of a superposition of channel-modified versions of the transmit signals $S_{T1x}$ and $S_{T1y}$ transmitted at both the x- and y-polarizations, respectively. The same will generally be true of the response at the v-polarization component of the first receiving antenna R1 and of the u- and v-polarization components of the second receiving antenna R2. The receiver 220 can perform signal separation operations to isolate the response at each receiver input that is attributable to each of the transmit signals.

In the case where the transmit signals $S_{T1x}$ and $S_{T1y}$ are made separable using frequency division multiplexing (as shown in FIG. 3), the respective signals $S_{T1x}$ and $S_{T1y}$ which are received at the u-polarization component of the first receiving antenna R1 can be obtained by isolating the frequency components respectively used by each of the transmit signals. The same can be done for the signals received at the other three receiver inputs. Of course, the particular signal separation operations that are performed will be dependent upon the technique (e.g., time division multiplexing, frequency division multiplexing, and/or code division multiplexing) used at the transmitter 210 to make the transmit signals separable. Techniques are known in the art for separating signals which have been combined using these multiplexing techniques, as well as other techniques such as eigendecomposition or singular value decomposition techniques. Any such separation techniques can be employed by the receiver 220.

In some embodiments, the received signals are coherently received and analyzed. Phase information can be preserved between the various received signals. For example, the received signals can share a common local oscillator 228 used in the down-conversion processing and the signals can be synchronously sampled during digital conversion. Coherence at the receiver may entail synchronization of the signal channels in various forms, which can include: phase synchronization; frequency synchronization, sampling synchronization; and local oscillator synchronization in frequency, time, and/or phase. Additionally, it may be desirable that the receiver signal channels are gain and phase matched (from the antennas to the analog-to-digital converters) across all frequency components of interest and that the local oscillator signal gains to each channel are substantially matched. In some embodiments, the receiver 220 can advantageously achieve precise control of the phase, amplitude, sampling, and frequency among the various receiver channels.

In some embodiments, the receiver 220 can also be coherent with the transmitter 210. For example, the transmitter 210 and the receiver 220 could share a common phase reference such as a local oscillator (e.g., as in a monostatic embodiment where the transmitter and receiver are colocated). (This can provide additional ways to characterize the transmitter-channel-receiver system by enabling, for example, the characterization of Doppler spreads induced in the system.)

As already mentioned, the signal channels of the receiver 220 can be phase and/or gain matched. In some cases, the phase and/or gain matching can be dynamically adjusted. This can be accomplished using phase shifting elements and/or amplifiers in each receiver channel. In some embodiments, these phase shifting elements and/or amplifiers can be adjustable based on, for example, a calibration control input. The calibration control input can be obtained by passing a calibration signal through the various receiver processing channels. The effect of each processing channel on the calibration signal can then be determined. A calibration control input can be generated in order to reduce or eliminate differences between the effects that each processing channel has on the calibration signal. For example, a calibration control input can be generated in order to reduce or eliminate differences between the respective gains of the receiver channels and/or to reduce or eliminate phase differences between the channels. In addition, the phase and/or gain matching can be temperature compensated to help reduce phase and/or gain mismatches which may be induced at different operating temperatures. Digital compensation of the digitized signals can also be employed to achieve phase and/or gain matching.

Receiver-Side Formation of Combinations of Transmit Signals

In order to determine the response at the receiver 120, 220 to transmit signals associated with various coherence states (e.g., relative amplitude and/or phase differences), such as polarization states and/or beam states, the transmitter 110, 210 could, according to conventional techniques, physically transmit signals associated with each of the various coherence states (e.g., polarization states and/or beam states) such that the responses at the receiver 120 can be measured. The transmitter 110, 210 could also implement an adaptive transmission scheme, according to conventional techniques, where multiple different sets of transmit signals associated with multiple different coherence states (e.g., polarization states and/or beam states) are sent to the receiver 120, 220 in order to identify a set of transmit signals which results in a desired signal characteristic at the receiver 120, 220. For example, the transmitter 110, 210 could send multiple sets of transmit signals to determine which results in the greatest or least signal power at the receiver.

In practice, conventional adaptive transmission strategies require channel state information (CSI) in order to synthesize an adaptive response. This information is typically obtained with some latency, limiting the effectiveness of such strategies. For example, consider two radios, radio A and radio B, in a time-division duplex (TDD) communication link over a fixed frequency band. Radio B receives a transmission from radio A and can therefore estimate the channel from a known preamble or pilots contained in the transmission. Radio B can then synthesize an adaptive response and transmit it over the same frequency band. The quality of the resulting adaptive response received by radio A will depend on various factors, including whether or not the channel state has changed in a non-negligible fashion between the time when the channel state estimate was formed and when the adapted signal is received. Channel dynamics may preclude the use of such adaptive schemes. A second approach for gaining channel state information is to have radio A convey the information to radio B. This approach would be applicable to non-reciprocal links, such as in frequency-division duplexing (FDD) systems. Again the quality of the CSI will be dictated in large part by the delay between channel estimation by radio A and receipt by radio A of the adaptive response from radio B.

But this disclosure describes improved techniques where a system can use receiver-side signal processing of transmit signals associated with a particular coherence state, such as a polarization state and/or a beam state, to estimate the receiver response to virtual transmit signals associated with any other arbitrary coherence state (e.g., an arbitrary polarization state and/or beam state). According to these techniques, when the transmit signals are coherently generated and are separable, adaptive transmission strategies involving arbitrary weighted combinations of the received versions of the transmit signals can be accomplished through signal processing at the receiver without any channel latency. This is one benefit of the disclosed techniques. Another benefit is that the weighted combining can be performed by any receiver.

Figure 4:
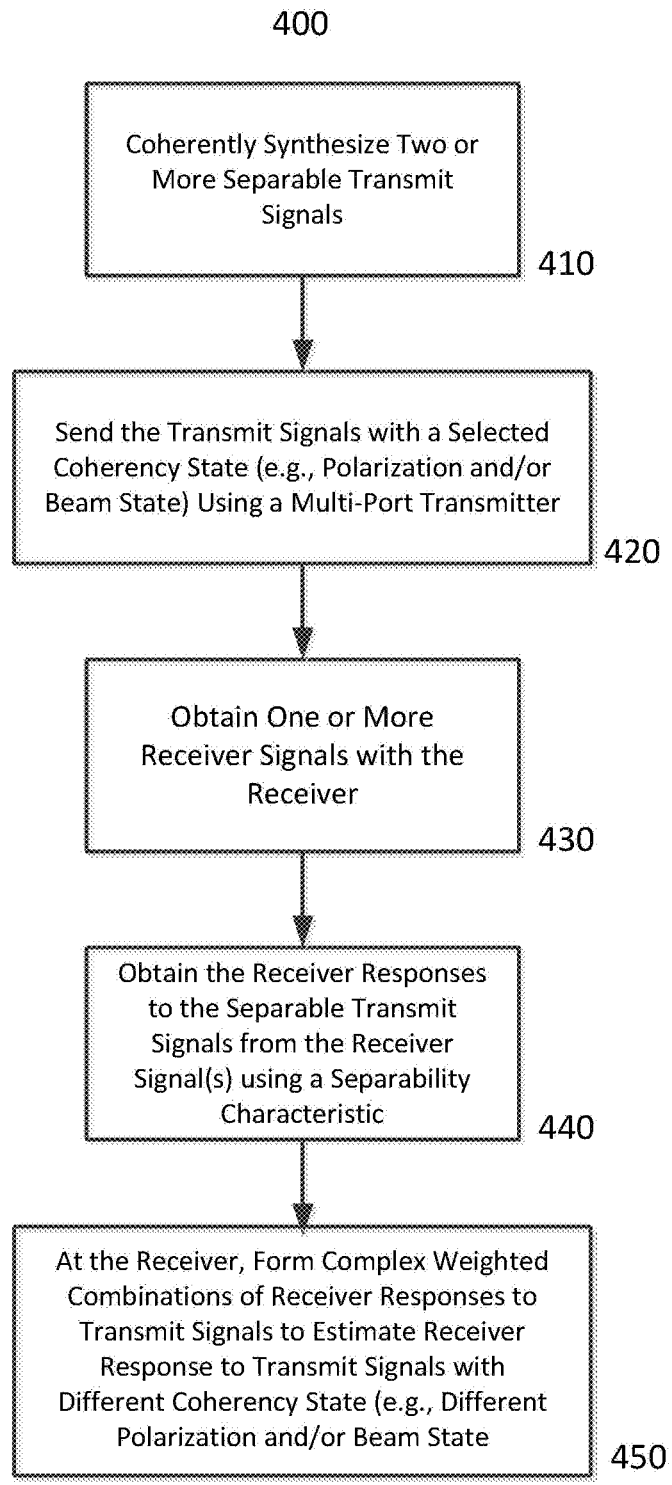
FIG. 4 illustrates an example method for estimating signals which would result at a receiver in response to transmit signals associated with various different coherence states (e.g., polarization states and/or beam states).

FIG. 4 illustrates an example method 400 for estimating signals which would result at a receiver 120, 220 in response to transmit signals associated with various different coherence states (e.g., polarization states and/or beam states). The method begins at block 410 where the transmitter 110, 210 synthesizes a set of separable transmit signals. The separable transmit signals may have any desired relative amplitude and/or phase differences with respect to one another. For example, the separable transmit signals may be designed to be associated with a particular polarization state and/or a particular beam state, as discussed herein. In this example, the transmitter includes two spatially-separated, dual-polarized antennas. The transmit signals from the first dual-polarized antenna are S1Tx and S1Ty, and the transmit signals from the second dual-polarized antenna are S2Tx and S2Ty.

At block 420, the transmitter 110, 210 sends the set of transmit signals associated with a first coherence state (e.g., a first polarization state and/or a first beam state). At block 430, the receiver 120, 220 receives one or more signals at its input ports. Following signal transmission and propagation through the channel, the response at each input port of the receiver will in general consist of channel-modified versions of each of the transmit signals. Each of these received signals may include portions of the received versions of multiple transmit signals. But so long as the transmit signals have a separability characteristic, the receiver 120, 220 can perform signal processing at block 440 to identify, isolate, and/or distinguish the received versions of the transmit signals. The signal separation operations performed by the receiver may isolate the transmit signals in order to determine the individual response at each receiver antenna which is attributable to each transmit signal.

Once the receiver 120, 220 has determined the received versions of the transmit signals, it can perform signal processing to estimate the response to a set of transmit signals having a different coherence state (e.g., relative amplitude and/or phase differences with respect to one another, such as a set of transmit signals associated with a different second polarization state and/or a different second beam state). This processing can include the formation of complex weighted combinations of the received versions of the transmit signals. For example, the receiver 120, 220 can scale and/or phase shift the received versions of the transmit signals with respect to one another and then combine them (e.g., by summing weighted transmit signals). In some embodiments, the combination can be a linear combination of weighted transmit signals. Each different set of complex weights may correspond to an estimate of the response at the receiver 120, 220 for a different transmit polarization state and/or beam state.

The received and separated versions of the transmit signals can be weighted and combined in a coherent fashion to simulate different transmission schemes through receiver-side signal processing. Table 1 summarizes the effects of different combinations and weightings of the received versions of the transmit signals.

TABLE 1

| Combinations | S1Tx | S1Ty | S2Tx | S2Ty | Description |
|---|---|---|---|---|---|
| Polarization from Antenna 1 | A | B | 0 | 0 | Complex ratio A/B determines Tx polarization |
| Polarization from Antenna 2 | 0 | 0 | C | D | Complex ratio C/D determines Tx polarization |
| x-polarized Beam Steering | E | 0 | F | 0 | Complex ratio E/F determines beam steering position of x-pol |
| y-polarized Beam Steering | 0 | G | 0 | H | Complex ratio G/H determines beam steering position of y-pol |

TABLE 1-continued

| Combinations | S1Tx | S1Ty | S2Tx | S2Ty | Description |
|---|---|---|---|---|---|
| Space-Polarization | K | L | M | N | Joint Space-Polarization combining with weighted combining |

These techniques do not require that virtual transmit signals associated with the second coherence state (e.g., a second polarization state and/or a second beam state) actually be physically transmitted. Instead, the receiver response to such virtual transmit signals is estimated using receiver-side signal processing. This receiver-side signal processing can be repeated any number of times in order to estimate the receiver responses to virtual transmit signals associated with any different coherence state (e.g., any different polarizations states and/or beam states).

The combining can be performed independently for each receiver port and for each sub-band. Other weighted combinations among the received and separated versions of the transmit signals for achieving adaptive transmission are also possible. In all cases, the weighted combinations can be applied on a sub-band-by-sub-band basis such that a different weighted combination can be applied to each sub-band. The ability to simulate adaptive transmission on a sub-band basis permits various signal processing capabilities. For example, weightings can be applied to achieve the capabilities listed in Table 2 on a sub-band-by-sub-band basis.

TABLE 2

| Capability | Description |
|---|---|
| Power Increase or Maximization | Adaptation is performed to achieve increased or maximum power transfer for each sub-band |
| Transmission Suppression or Null | The weights are adjusted on each sub-band to suppress or null the transmitter response at the particular receiver port |
| Reduced or Zero Dispersion | Weights are computed to yield a response at the receiver that exhibits reduced or zero dispersion |
| Orthogonal Modes | The weights are adjusted to achieve one or more simultaneous orthogonal modes |

Figure 5:
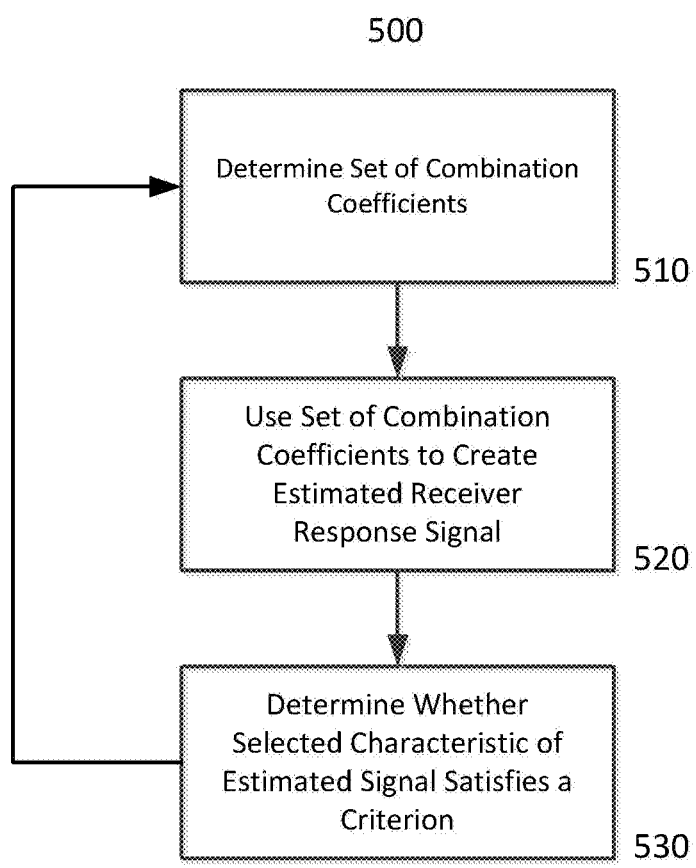
FIG. 5 illustrates an example method by which a receiver can perform adaptive processing of estimated responses to transmit signals associated with different coherence states (e.g., polarization states and/or beam states).

FIG. 5 illustrates an example method 500 by which a receiver 120, 220 can perform adaptive processing of estimated responses to transmit signals associated with different coherence states (e.g., polarization and/or beam states). At block 510, the receiver 120, 220 can determine a set of coefficients for combining the received versions of the transmit signals, as discussed with respect to FIG. 4. The coefficients may be complex valued weights. And different sets of combining coefficients can be used for different frequency sub-bands of the received versions of the transmit signals.

At block 520, the receiver 120, 220 can use the set of coefficients to form a combination of the received versions of the transmit signals. For example, the receiver 120, 220 can multiply each transmit signal by one of the complex value coefficients. This will result in the amplitude of the transmit signal being scaled and the phase being shifted. The receiver 120, 220 can then sum the scaled, phase-shifted transmit signals. As already discussed, this estimated signal corresponds to the receiver response which would have resulted from the transmit signals if they had had different relative amplitude and/or phase differences with respect to one another (e.g., if the transmit signals had been associated with a different polarization state and/or a different beam state).

After forming the combination of the transmit signals, at block 530 the receiver 120, 220 can determine whether a selected characteristic of the resulting estimated signal satisfies a criterion. For example, the characteristic could be signal power, and the receiver 120, 220 could determine whether the signal power of the estimated signal exceeds or falls below a threshold (e.g., signal power maximization or minimization). According to another example, the characteristic could be the received coherence/polarization state or coherence/polarization mode dispersion curve, and the receiver 120, 220 could determine whether the polarization state or coherence/polarization dispersion curve of the estimate signal satisfies one or more criteria that define the desired polarization state or curve. If the criterion or criteria is/are satisfied, the method 500 may optionally terminate. Otherwise, the method may iteratively cycle with different sets of combining coefficients until an estimated signal is identified which satisfies the criterion/criteria. The new set of combining coefficients can be chosen with, for example, adaptive algorithms. The following are some example adaptive strategies which can be implemented with the method 500.

Increase or Maximize Received Power—The first strategy involves forming a complex weighted sum of the received versions of the transmit signals, where the combining weights may be a function of frequency sub-band, to increase or maximize the power transfer in the response at the receiver 120, 220.

Interference Avoidance—Another strategy involves forming a complex weighted sum of the received versions of the transmit signals, where the combining weights may be a function of frequency sub-band, to suppress or null the response at a targeted receiver port.

Beamsteering—Another strategy involves forming a complex weighted sum of the received versions of the transmit signals, especially of the same polarization, where the weights may be a function of frequency sub-band, to achieve beamsteering. Beams may be formed in a manner, for example, to achieve a beam of a first polarization (e.g., vertical polarization) and a beam of a second polarization (e.g., horizontal polarization) that can be steered via relative phasing (and perhaps relative amplitude control) between the transmit signals.

Reduced or Zero Dispersion—Yet another strategy involves forming a complex weighted sum of the received versions of the transmit signals, where the combining weights may be a function of frequency sub-band, to achieve a desired polarization state at a targeted receiver antenna element.

Other adaptive techniques are also possible. The techniques described herein are based on the recognition that when transmit signals are generated in a coherent and separable manner, effects similar to the actual physical transmission of the transmit signals may be achieved through weighted combinations applied to the received and separated versions of the transmit signals at the receiver 120, 220.

For example, consider separable V-polarization and H-polarization transmit signals, where the transmit signals are applied on even and odd sub-bands, respectively, to achieve (at least ideally) orthogonal signaling (as shown in FIG. 3). The receiver 120, 220 may have vertically and horizontally polarized receiving antenna elements (i.e., V and H ports) (although any polarization basis could be used). The V receive port receives both the transmit V and H signals leading to VV and VH signals that are on even and odd sub-bands, respectively. These transmit signals can then be interpolated so that a signal response estimate is available at each sub-band. In a similar fashion, for the H receive port, the transmit V and H signals are received, leading to HV and HH signals that are on even and odd sub-bands, respectively. These transmit signals can then be interpolated so that a signal response estimate is available at each sub-band. The VV, VH, HV, and HH signal responses may then be coherently combined to achieve the effect of coherent combining at the transmitter. For example, VV and HV may be weighted with relative amplitudes and phases to achieve the effect associated with any arbitrary transmit polarization state. This combination may result in the signal on the H port of the receiver.

Receiver-Side Formation of Combinations of Received Signals

In addition to the receiver-side combining of receiver responses to separable transmit signals, the receiver 120, 220 may also form combinations of the received signals from the various receiver ports (e.g., after separating out the received versions of the various transmit signals which may arrive at each receiver port). Complex weighted combinations of the received signals can be used for the following purposes:

Forming a complex weighted sum of coherently received signals, where the combining weights may be a function of frequency sub-band, to increase or maximize the received power in the system response.

Forming a complex weighted sum of coherently received signals, where the combining weights may be a function of frequency sub-band, to suppress or null a targeted transmitter port.

Forming a complex weighted sum of coherently received signals, especially of the same polarization, where the weights may be a function of frequency sub-band, to achieve beam steering. Beams may be formed in a manner, for example, to achieve a beam of a first polarization (e.g., vertical polarization) and a beam of a second polarization (e.g., horizontal polarization) that can be steered via relative phasing (and perhaps relative amplitude control) between the receive antenna elements.

Forming a complex weighted sum of coherently received signals, where the combining weights may be a function of frequency sub-band, to achieve a desired polarization state from a targeted transmit antenna. As with the formation of transmit signal combinations, the formation of receive port combinations can be performed in various ways using various metrics. Examples are shown in Tables 3 and 4 for a receiver which has four ports and is connected to two dual-polarization antennas. The received signals at the two ports corresponding to the first antenna are R1x and R1y, while the received signals at the two ports corresponding to the second antenna are R2x and R2y.

TABLE 3

| Combinations | $R_{1x}$ | $R_{1y}$ | $R_{2x}$ | $R_{2y}$ | Description |
|---|---|---|---|---|---|
| Polarization from antenna 1 | A | B | 0 | 0 | Complex ratio A/B determines Rx polarization |
| Polarization from antenna 2 | 0 | 0 | C | D | Complex ratio C/D determines Rx polarization |
| Rx x-polarized Beam Steering | E | 0 | F | 0 | Complex ratio E/F determines beam steering position of Rx x-pol |

TABLE 3-continued

| Combinations | $R_{1x}$ | $R_{1y}$ | $R_{2x}$ | $R_{2y}$ | Description |
|---|---|---|---|---|---|
| Rx y-polarized Beam Steering | 0 | G | 0 | H | Complex ratio G/H determines beam steering position of Rx y-pol |
| Space-Polarization | K | L | M | N | Joint Space-Polarization combining with weighted combining |

TABLE 4

| Capability | Description |
|---|---|
| Power Increase or Maximization | Adaptation is performed to achieve increased or maximum power transfer for each sub-band |
| Transmission Suppression or Null | The weights are adjusted on each sub-band to suppress or null the targeted transmitter port |
| Reduced or Zero Dispersion | Weights are computed to yield reduced or zero dispersion |
| Orthogonal Modes | The weights are adjusted to achieve one or more simultaneous orthogonal modes |

One application of this technique involves its utilization in efficient multi-port system response measurements. By employing separable coherent transmit signals from an array and coherently receiving these signals with a separate array, it is possible, through digital processing of the received signals, to steer the transmit beams and received beams so that a response can be determined for each of the Tx/Rx beam steering combinations in digital signal processing without having to directly steer the beam at the transmitter and at the receiver for each measurement.

Joint Formation of Combinations of Transmit Signals and Received Signals

As just discussed in the preceding sections, weighted combinations of the receiver responses to the separable transmit signals and weighted combinations of the received signals may be computed independently. It is also possible that the weights can be determined jointly, for example through joint optimization schemes. An example would be to determine the weights that collectively lead to the best signal-to-noise ratio.

Experimental Validation

An experiment was conducted to demonstrate the following:
Using orthogonal dual-polarized transmit and receive antennas along with separable transmit waveforms, it is possible to calculate the channel Jones matrix. This can be accomplished using the techniques described in Appendix 1.
In a multipath environment where significant polarization mode dispersion (PMD) is present, the Jones matrix can be calculated as a function of frequency. (See Appendix 1.)
Using the calculated frequency-dependent Jones matrix, it is possible to estimate the frequency-dependent received signal polarization for any transmit polarization. (See Appendix 1.)
The experiment details are listed below:
Dual-polarized antenna (horizontal (H)/vertical (V)) for both transmit and receive
Transmit/Receive antenna separation: approximately 20 feet
Transmit/Receive signal frequency: 2.512 GHz
By using separable transmit waveforms, it is possible to process the received signal in order to separate the channel response for each of the two transmit antenna ports (H and V). This permits the calculation of each of the four Jones matrix elements (HH, HV, VH, and VV). (See Appendix 1.) There are several ways to design separable waveforms, such as with time or frequency multiplexing. In this example, frequency multiplexing was used, where H and V polarizations were transmitted on different, interleaved frequencies within the overall signal bandwidth. In addition to the interleaved H and V polarizations, the waveform also included two additional interleaved polarizations, slant-45 (S-45) and right-hand circular (RHC), so that the signal received from these additional polarizations could be compared to the estimates produced using the Jones matrices calculated from the H and V transmissions. The effectiveness illustrates the viability of receiver-based transmit signal combining.

Figure 6:
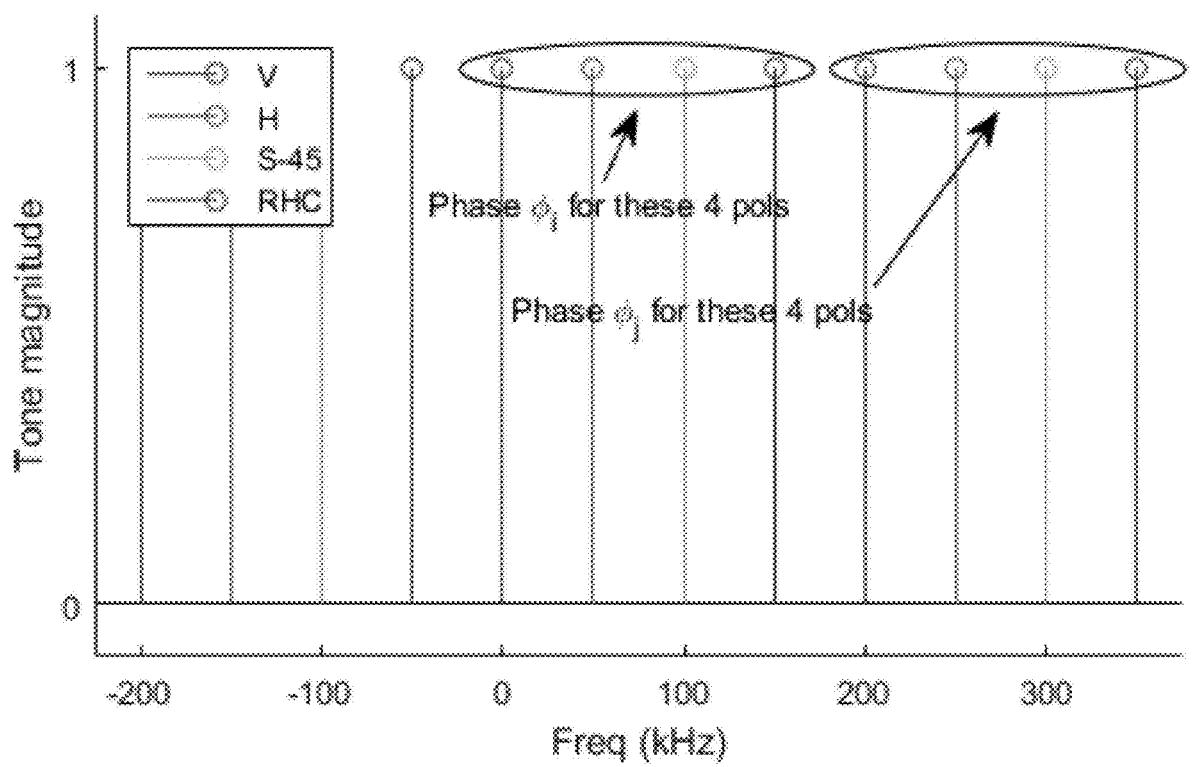
FIG. 6 shows a portion of the frequency spectrum of an example transmit signal waveform with interleaved polarization states.
Figure 7:
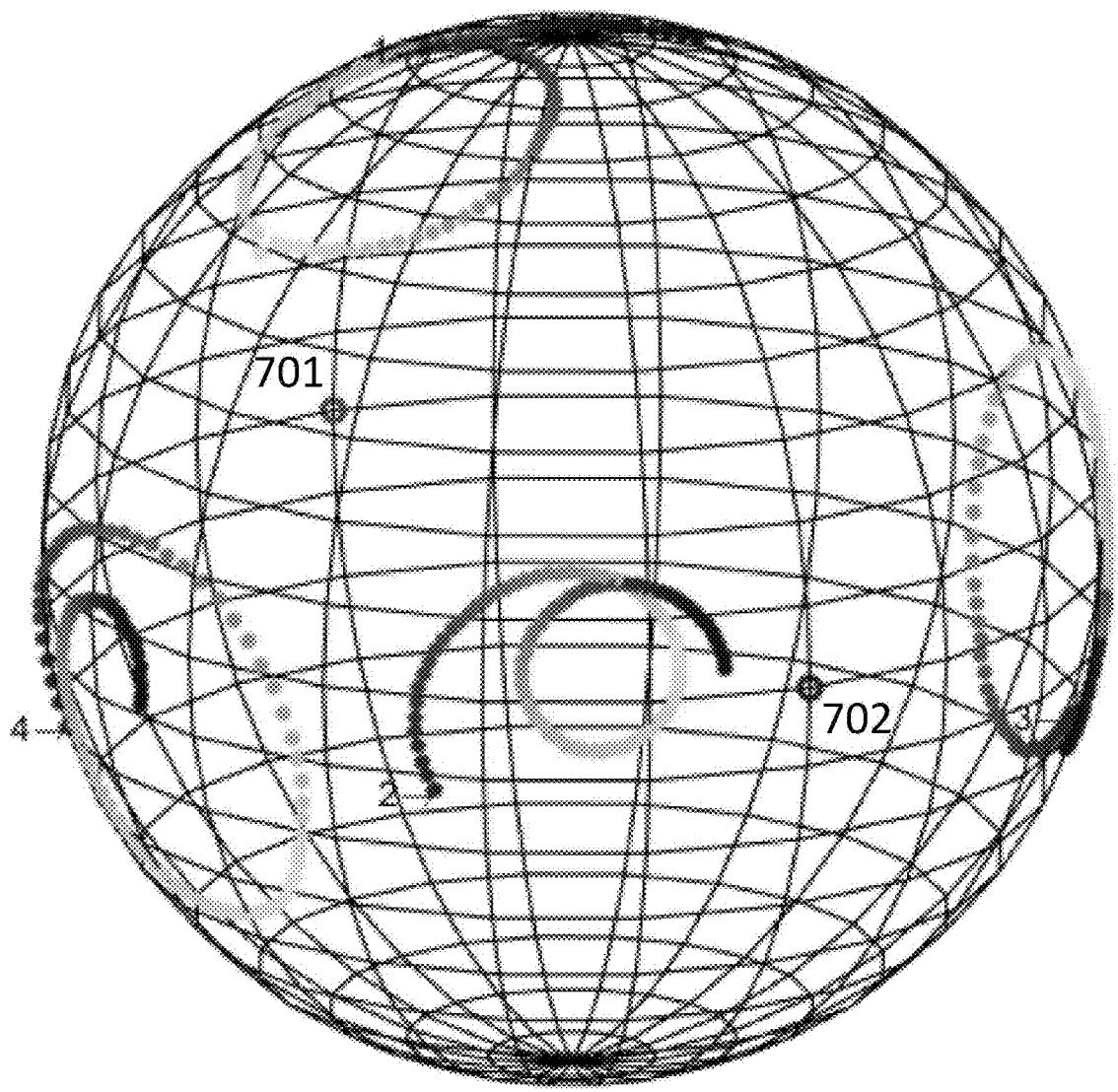
FIG. 7 shows an example of the received polarization states, sub-band-by-sub-band on the Poincaré sphere, for transmit signals using the transmit waveform of FIG. 6.

The transmit waveform had the following characteristics:
400 tones equally spaced across 20 MHz (50 kHz spacing)
Tones had interleaved polarizations: V, H, S-45, and RHC
Tones had equal magnitude
Each group of four adjacent tones had the same random phase. This implies 100 unique phases across the 400 tones
FIG. 6 shows a portion of the frequency spectrum with interleaved polarizations
FIG. 7 shows the received signal polarization on the Poincaré sphere for a transmission using this waveform in the laboratory. The identifiers 1-4 represent the received signal for transmit polarizations vertical (V), horizontal (H), slant-45 (S-45), and right-hand circular (RHC), respectively. Each point in each curve represents a frequency sub-band and each curve spans the baseband signal bandwidth from −10 MHz to +10 MHz.

The circles 701, 702 on opposite sides of the Poincaré sphere represent the received signal polarizations H and V, respectively, while the top pole on the sphere represents RHC. Each of the four curves in FIG. 7 shows substantial polarization mode dispersion (PMD), which is a spread in the polarization state as a function of frequency. (PMD can occur in, for example, multipath channels.) In addition, the mean received signal polarization for a curve is not always similar to its transmit polarization. For example, the mean received signal polarization for V transmission (identified by "1" in the figure) is close to RHC. The mean received signal polarization for RHC transmission (identified by "4") is nearly linear and close S-45.

Figure 8:
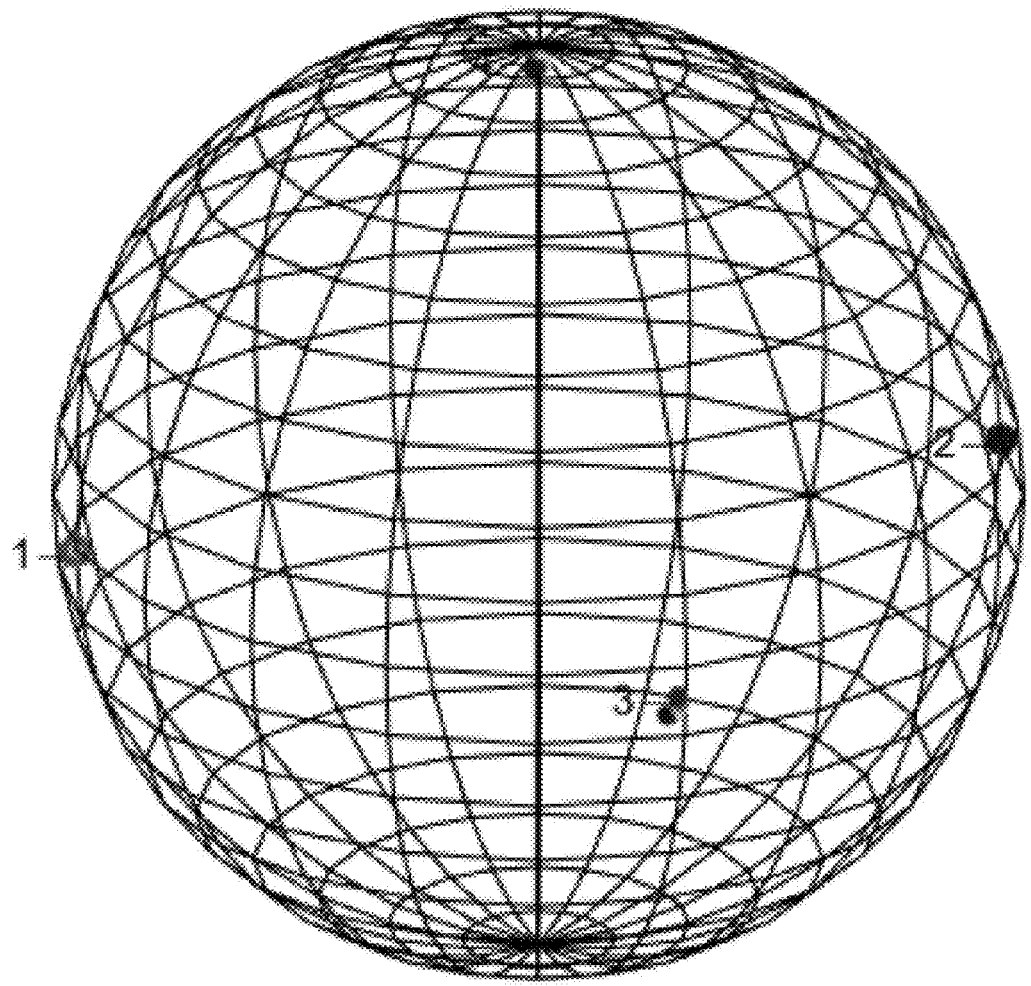
FIG. 8 shows an example of the received polarization states, on the Poincaré sphere, for the case where the transmitter and receiver are directly connected by cables (bypassing the antennas).

For comparison, FIG. 8 shows the received signal polarization on the Poincaré sphere for the case where the transmitter and receiver are directly connected by cables (bypassing the antennas). For this case where there is no multipath and no PMD, the four received signal polarizations are approximately equivalent to the four transmit signal polarizations as expected.

Although the transmit signals include four interleaved polarizations, it is possible to use the first two orthogonal polarizations, V and H to calculate the Jones matrix. This matrix can then be used to estimate the received signal polarization for any transmit polarization. (See Appendix 1.) In order to account for the variation of this matrix over frequency (due to PMD), a distinct Jones matrix at each tone frequency can be calculated.

Figure 9:
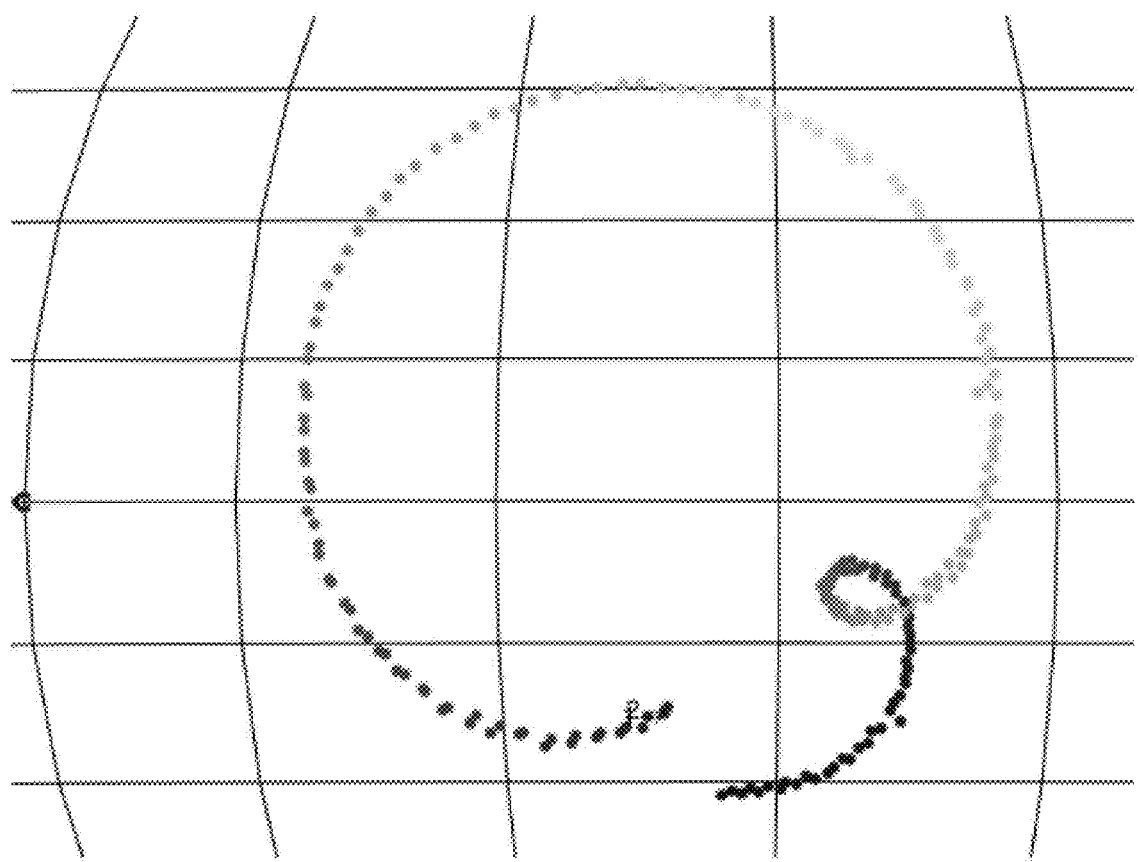
FIG. 9 shows comparisons of the actual vs. estimated receiver responses for transmit signals with an associated slant 45 polarization state.
Figure 10:
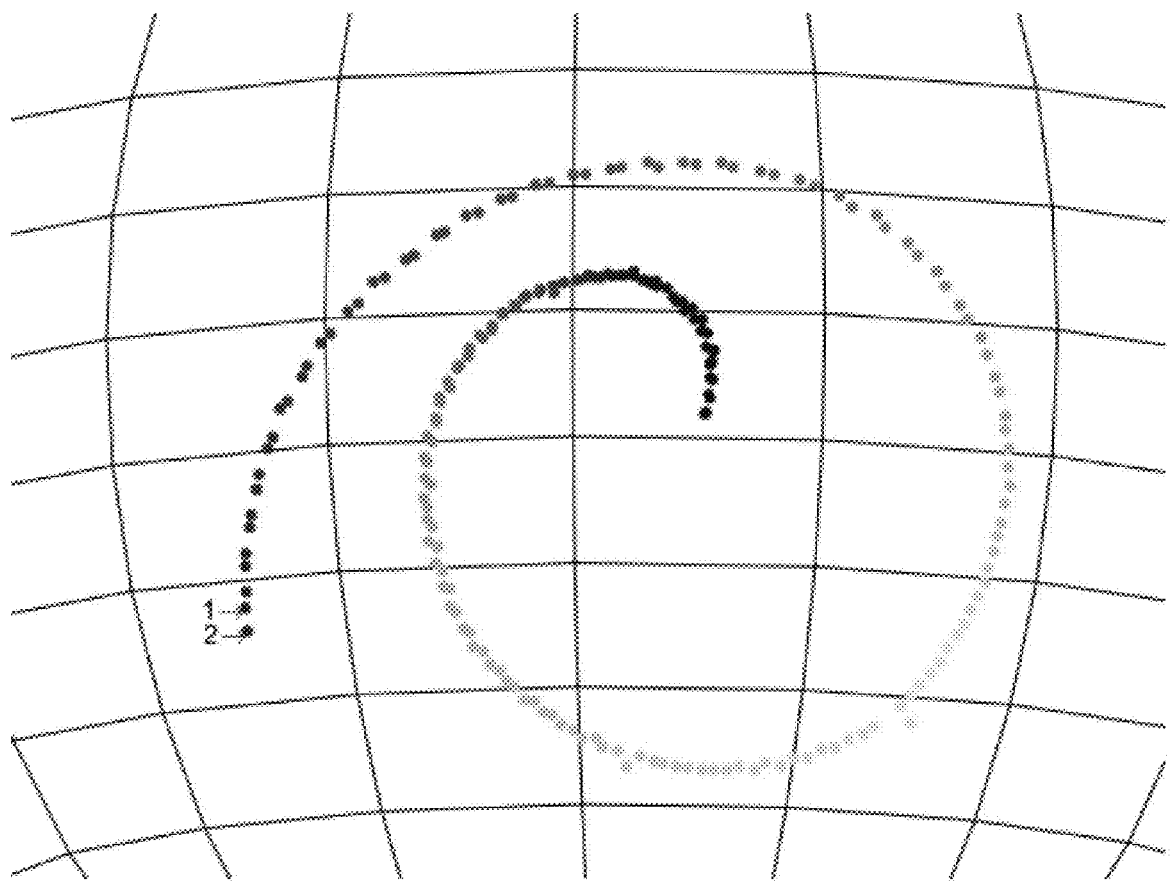
FIG. 10 shows comparisons of the actual vs. estimated receiver responses for transmit signals with an associated right-hand circular polarization state.

FIG. 9 and FIG. 10 show comparisons of the actual signal received for transmit signal polarizations S-45 and RHC with the corresponding estimates produced using the Jones matrices formed from the H and V receptions. The identifier "1" in the figures represents the actual receive polarization while the identifier "2" represents the polarization estimated from the Jones matrix calculations. Note that in both figures, the actual and estimated polarizations are nearly equal across the full signal bandwidth.

Application to Study of Spatial Vibrations

Figure 11:
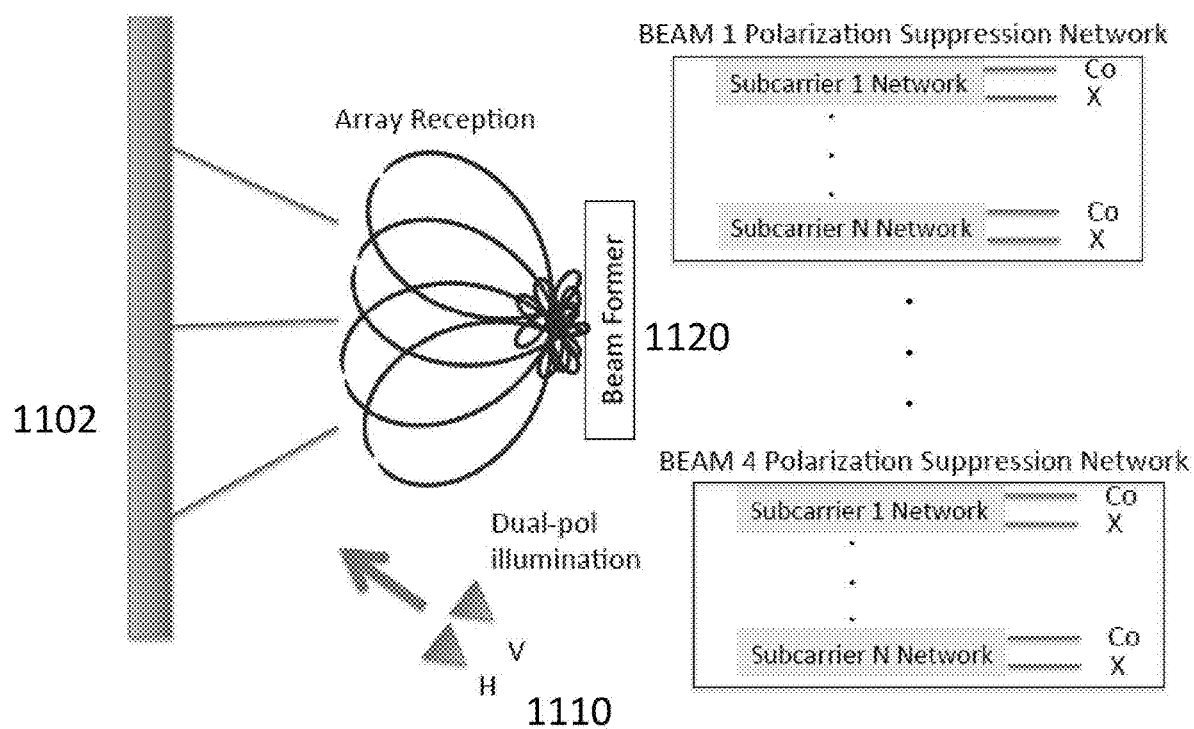
FIG. 11 illustrates an example embodiment of a vibration sensing system that uses a dual-polarized transmitter and a phased array receiver.

The coherent signal processing techniques described herein can be applied in the context of sensing. FIG. 11 illustrates an example embodiment of a vibration sensing system that uses a dual-polarized transmitter 1110 and a phased array receiver 1120. The dual-polarized transmitter 1110 sends separable transmit signals from the orthogonally-polarized ports. This can be accomplished, for example, by transmitting the signal from one of the polarizations on even sub-bands of OFDM symbols, and the signal from the orthogonal polarization on odd sub-bands (as shown in FIG. 3). The signals illuminate a target, which in this case is a metal beam 1102 whose vibration modes are to be analyzed. (Any object whose vibrations are desired to be measured could alternatively be used.) A digital beamforming array is used at the receiver 1120, so that linear combinations of the received signals can be combined to effectively steer a received beam to arbitrary locations along the vibration target 1102. The effective resolution of the beam may be dictated by the aperture dimension of the receiver array relative to the wavelength of the carrier signal being employed. In some embodiments, the resolution may provide, for example, four largely independent directions (or locations on the target 1102) with little overlap of the beams. This could be improved through the utilization of super-resolution techniques, including subspace techniques, such as Estimation of Signal Parameters via Rotational Invariance Technique (ESPRIT), MUltiple SIgnal Classification (MUSIC), etc.

The system in FIG. 11 can be used to characterize vibrations based on reflected energy coming from the different segments of the target 1102. However, a complicating factor is that the illumination signals also couple energy into the receiver 1120 through other paths, including a direct path from the transmit antenna sidelobes into the receive antennas. This energy may bias measurements at the receiver 1120, making it difficult to localize vibrations. To help overcome this issue, virtual transmit polarization control may be employed through digital signal processing at the receiver 1120. In particular, the outputs from the beamformer receiver may be fed to a parallel bank of signal processing nulling networks (e.g., one per beam). Due to the separability of the transmit signals, each beam formed by the receiver has associated with it two signals, one for each of the separable transmit signals. These signals are then fed through a signal processing network that linearly combines the transmitted signals for vibration sensing. The specific signal processing approach involves measuring the beamformer response for each beam position and for each separable signal. The system response can then be nulled at each beamformer position by determining the weighted combination of the transmit signals required to achieve a beamformer null for each sub-band. This process is performed for each beamformer position, leading to a weight setting for each sub-band for each beam. Once this nulling process has been achieved, the weight settings may be applied to detect the change in movements associated with each beam position. Any change in the target will result in a non-zero output from the beamformer in which the target response has moved due to the vibrations.

Application to Remote Sensing

When separable signals are transmitted from two or more transmit ports, the resulting signals at the receiver 120, 220 include the information necessary to determine the frequency-dependent response (e.g., PMD or CSD curves—See U.S. patent application Ser. No. 14/936,536, the entirety of which is hereby incorporated by reference) for arbitrarily-weighted relative amplitude and phasing of the separable transmit signals. So, for example, if the transmit signal is sent with separable vertical and horizontal polarizations from a dual-polarized antenna, then, based on the measured responses at a dual-polarized receiver 120, 220, which would in general consist of a frequency-dependent response (PMD curve) from the vertical transmission and a frequency-dependent response (PMD curve) from the horizontal transmission, it is possible to determine the frequency-dependent response (PMD curve) at the receiver 120, 220 for an arbitrary transmit polarization, such as a right-hand circularly polarized transmit signal. In other words, the receiver 120, 220 can apply a set of complex weights to the received responses to the separable transmit signals (with different weights for each sub-band, in general) in order to generate the frequency-dependent PMD response corresponding to any arbitrary transmit polarization, or when applied more generally to other transmit signal pairs, to CSD state(s) of the transmitter signals. In this way, PMD and CSD curves can be generated for arbitrary transmission states.

In addition, based on information provided by the measured responses to the transmit signals at the receiver 120, 220, the receiver can perform calculations to determine the weights for the transmit signal responses which yield the best performance based on some chosen metric. This may be desirable in some cases in which certain weightings for the transmit signal responses will more effectively isolate a characteristic of interest from, for example, a target in the channel, and these weightings can be applied in digital signal processing at the receiver 120, 220. For example, if the metric were signal-to-noise ratio and there were a desire to improve or maximize that ratio at the receiver 120, 220, then such calculations could be used to determine what weights for the transmit signal responses would achieve that goal. Other metrics could include achieving a null at the receiver 120, 220 or achieving a common polarization state at the receiver for all sub-bands (i.e., zero polarization dispersion). When the weighting for the transmit signal responses is varied with sub-band, the resulting PMD or CSD curves at the receiver 120, 220 may no longer be continuous.

Received signals associated with a common transmit signal can also be weighted with complex scale factors in a similar fashion to produce a result that corresponds to an arbitrary received polarization configuration or CSD state (a relative amplitude and phase between two ports defining the CSD state). The complex weights can be set on a sub-band-by-sub-band basis. The receiver 120, 220 may also combine the signals received on each receive antenna using both strategies by employing weightings on the separable transmit signal responses (which is performed at the receiver 120, 220), and then performing signal weightings across receive antennas, all as a function of sub-band. These complex weightings for the separable transmit signal responses and the received signals (e.g., at each receiver port) can be determined independently or jointly, and may be based on various metrics such as SNR maximization. The separability and coherence of the transmit signals as well as the coherence of the receiver 120, 220 enable these combining strategies to achieve arbitrary PMD or CSD states at the transmitter 110, 210 and the receiver 120, 220.

The ability of a transmitter 110, 210 to transmit a signal that does not impact a specified receiver 120, 220 is a promising approach in spectrum sharing and cosite mitigation applications. Typically, this type of interference avoidance (by the transmitter 110, 210 as viewed by the receiver 120, 220) can only be achieved if the transmitter 110, 210 has channel state information describing the channel between the transmitter 110, 210 and the receiver 120, 220. Various methods exist to obtain this information. One assumes operation in a time division duplex (TDD) mode so that a transmission is received from the receiver 120, 220 to be nulled. This signal from the receiver 120, 220 to be nulled can be used by the transmitter 110, 210 to estimate the channel. Another approach requires channel state feedback from the receiver 120, 220, which consumes spectral resources and must be updated in mobile channels. In cosite applications, feedback may be readily achieved since the transmitter 110, 210 and the receiver 120, 220 to be nulled may share a common platform. However, in other applications such feedback is not necessarily available. Therefore, the separable transmission technique offers an approach to alleviate the need for channel state information at the transmitter 110, 210. Instead, the transmitter 110, 210 employs separable transmit signals which can then be separated and re-combined by the receiver 120, 220 in signal processing to determine the weighted combination of transmit signal responses to achieve a null. A benefit of this approach is that it facilitates suppression of the transmit signal by any receiver 120, 220, suggesting its usefulness in spectrum sharing applications.

The process of nulling (i.e., of achieving a zero or near-zero response at a receiver 120, 220) can be achieved in adaptive antenna systems through a weighted combination of the signals that are passed to the antenna ports. This type of nulling requires channel state information at the transmitter 110, 210 from the receiver to be nulled. As previously discussed, this information can be obtained through receipt of a transmission from the receiver to be nulled that is at approximately the same frequency, or the receiver 120, 220 can pass channel state information to the transmitter 110, 210 through some communication link. In either case, the transmitter 110, 210 can form an approximate null in the direction of the receiver 120, 220. But this null will, in general, dissipate in dynamic channels, due to transmitter motion, receiver motion, or motion in the propagation channel, for example. An alternative approach is to utilize separable transmit signals from the multiple ports of the transmitter 110, 210 and allow the receiver 120, 220 to perform receiver-side digital combining of the separated transmit signal responses. This method can be applied to each packet without requiring channel state information at the transmitter 110, 210, and the receiver 120, 220 is able to apply the techniques effectively, even in dynamic channels.

Transmit beam-steering represents an adaptive transmission technique, where weighted combinations are applied across the antenna elements in order to steer a beam to a desired location. Conventional phased array beam steering introduces phase and amplitude offsets to the signal feeding each transmitting antenna. This can preferentially direct the signal power in a particular direction. The same technique (i.e., applying phase and amplitude offsets to the signals arriving at each receiving antenna) can be used to make the receiver 120, 220 more sensitive to signals arriving from a certain direction. This capability can be applied in radar systems, for example, to steer a tracking beam towards a known target position, or to sweep acquisition beams to cover a predefined azimuth/elevation space. In the absence of separable transmit signals, the received response would be specific to the particular beam position used in the transmission. However, with separable transmit signals using the techniques described herein, the beam position can be virtually controlled in digital signal processing at the receiver 120, 220 to synthesize the response for any arbitrary transmit beam position.

Application to Radar

This section discloses various different adaptive receiver 120, 220 processing schemes and adaptive transmission schemes for interference suppression and avoidance to enhance target detection in radar systems. The technique of receive combining using separable coherent transmit signals provides flexibility to apply signal processing techniques in acquisition across all resolution cells.

Electromagnetic energy falling within appropriately designed receiver 120, 220 suppression filters can be used to suppress interference, for example to suppress the clutter response for radar detection of a target. When Doppler discrimination between the clutter and the target is not feasible and when the clutter and target are co-directional, suppression filtering based on space and frequency cannot readily be applied. However, discrimination based on polarization responses or other coherent state responses, as discussed herein, may be feasible. The techniques described herein involve the exploitation of polarization-frequency characterizations, where polarization dispersion effects versus the signal frequency components are considered. They also extend more generally to coherent signal dispersion effects in general. This portion of the description is discussed in the context of polarization effects, but it should be understood that any of the techniques described herein can also be used. With this technology polarization-frequency domain filtering may provide a viable means to help separate a target from clutter returns. This section discloses different polarization-based suppression methods, including polarization and polarization-frequency techniques, to support the radar detection problem.

Polarization filters can be used to suppress narrowband signals. Polarization suppression techniques offer unique capabilities that are distinct from those of adaptive arrays. Arrays, for example, can form directional nulls using digital signal processing where minimum mean square error (MMSE) solutions can be formed to increase or maximize the resulting signal to noise ratio. However, if the desired signal is in the direction of the interference, both the desired signal and the interference are subject to filter suppression effects, limiting achievable Signal-to-Interference (SIR) ratios. In more advanced space-time adaptive processing (STAP) systems, where delay taps are combined with array element, an additional dimension can be applied that enables joint space-frequency suppression. These techniques may enable the processor to suppress interference exhibiting delay spreads due to temporal dispersion induced by the channel. However such processing still has limited application for interference that is co-directional with the desired signal, especially for signals with comparable Doppler frequencies. In contrast, polarization-based techniques provide a degree of freedom that enables suppression of interference that is co-directional with the desired signal. A good or optimal polarization filter which increases or maximizes the SIR may be related to the null polarization of the interference, the polarization of the desired signal and the signal-to-interference power ratio (SIR) level.

The polarization suppression technique described above is ultimately a narrowband suppression technique that is suitable when the interference signal exhibits flat fading across the signal bandwidth and hence can largely be mitigated by the same polarization filter. In frequency-selective multipath channels, such as exhibited by a target in a background of clutter when linear frequency-modulated (LFM) radar waveforms are used, a single filter would generally not be adequate to suppress the interference across the entire signal bandwidth. The above technique can therefore be extended to provide suppression capabilities as a function of the interference frequency components, as described next.

In multipath channels with temporal dispersion (delay spread) and polarization coupling (depolarization), the polarization state of a signal is known to be dispersive in polarization. In other words, the signal polarization state at the receiver 120, 220 will vary with the signal's frequency components—a phenomenon referred to as polarization mode dispersion (PMD). Because of PMD, a single polarization filter will not generally be sufficient to suppress interference in a frequency-selective multipath channel. Rather, it may be necessary to employ distinct polarization filters as a function of the frequency sub-band of the received signal. This technique divides the received signal into frequency sub-bands, applies polarization filtering within each sub-band, and then combines the residues. Equalization of the residue signal can then be applied (for example in a communications system) to compensate for the polarization filtering effects to enable decoding.

The actual processing can be applied either in the time domain or the frequency domain, and different suppression algorithms can be applied as well, such as zero-forcing or MMSE suppression. The suppression filtering is typically applied in digital signal processing (e.g., after the analog-to-digital converter). This approach has been demonstrated using a wideband communications testbed at the University of Notre Dame and has direct application to radar detection of a target in clutter. A challenge, however, is to elicit a PMD response using suitable waveforms and receiver signal processing. Measurement of the PMD response, or a comparable characterization, may be needed for each radar resolution cell so that frequency-dependent polarization filters can be applied. For example, conventional processing of LFM waveforms, such as matched filtering, would not lead to PMD characterizations, and alternative receiver processing may be needed to identify and apply suitable frequency-dependent polarization filters. Appropriate radar waveform and receiver processing algorithm designs may facilitate frequency-dependent polarization-based filtering. Assuming polarization filtering can readily be applied, an important question is how the polarization filters should be set to suppress clutter. One approach is to identify the average polarization response as a function of radar waveform frequency in the cells around the target cell and use this estimate to design the polarization suppression filter for the target cell. In so doing, the clutter response in the target cell may be largely suppressed, leading to higher visibility of the target response.

Another approach is a suppression approach where interference suppression filtering is applied in the analog RF domain prior to analog-to-digital conversion. The approach is based on the use of a nulling network providing a form of zero-forcing. The nulling network is a two-port in, two-port out device consisting of a phase shifter segment, a hybrid, another phase shifter section, followed by another hybrid. The two outputs correspond to the matched polarization response and to the null response. To achieve the null, the phase shifters are set based on measured polarization parameters of the received signal. This approach addresses only narrowband suppression, where the polarization filter is applied across the entire signal bandwidth, which generally would not be suitable in a frequency-selective environment. In such a case, this approach would have to be applied across all of the frequency content of the signal.

An extension of this approach involves an analog version of the digital processing PMD-suppression techniques described herein. The method uses a bank of analog filters, each similar to the network described in the preceding paragraph, or other suitable filter, to enable frequency-dependent polarization suppression in the analog domain. This front-end filtering bank may help provide improved dynamic range in environments with strong interference (typical of radar and other cosite arrangements) that cannot be achieved after analog-to-digital conversion in digital signal processing.

Adaptive transmission has been widely considered in radio frequency systems as a strategy for enhancing system performance. The premise of these approaches is generally to obtain channel state information at the transmitter 110, 210 and then to use this information to adapt transmissions to improve the system performance according to some metric (e.g., capacity). An obstacle to implementing adaptive techniques is the need to obtain channel state information and to obtain it in a timely manner. In communications systems, the most practical approaches that have been considered include measuring the channel directly from a transmission from the intended receiver 120, 220, for example in a time-division duplex (TDD) communications system.

A second approach is to have the intended receiver 120, 220 measure the channel and provide feedback to the transmitter 110, 210 through a separate control channel. In the case of monostatic radar systems, the channel state information can be measured directly on a pulse-to-pulse basis, suggesting that adaptive techniques can readily be applied in radar systems. Several adaptive schemes have been discussed in literature, including for communications systems that take advantage of channel state information at the transmitter 110, 210 (CSIT). In these systems, CSIT is normally leveraged so that data can be transmitted over the eigenmodes of the channel, usually with the purpose of maximizing system capacity. These systems often use water filling methods to distribute power among the eigenmodes. Radar systems can similarly leverage CSIT to benefit radar system performance through adaptive transmission schemes.

In the specific case of RF systems with transmit polarization agility, polarization modulation schemes can be applied either in a blind fashion without channel state feedback, or in an adaptive fashion when CSIT is available. One example of a blind implementation involves switching between two orthogonally-polarized states to help reduce the impact of polarization-related degradation. Similar methods have been proposed in optical fiber communications systems. Others have used polarization switching to help reduce peak-to-average-power ratios and to improve inter-carrier interference tolerance by doubling the co-polarized sub-band spacing in an OFDM system. A wide variety of blind polarization modulation techniques can be used, where equalization at the receiver 120, 220 is used with pilots to aid in the recovery of the polarization state.

Channel state information for systems with dual-polarized antennas facilitates the possibility of adaptive polarization transmission schemes. In some narrowband polarization transmission schemes, a polarization response is applied across the entire bandwidth of the transmit signals. Polarization control, however, can also be adapted on a wideband basis to exploit the system eigenmodes for wideband communications. Wideband adaptive polarization transmission techniques may include the strategy of adapting the polarization state as a function of the frequency sub-band due to PMD effects, and also recognizing various ways that such control could be used to achieve different signaling effects at the receiver 120, 220. Adaptive transmission strategies may include: 1) increasing or maximizing the SNR, which is akin to eigenmode analysis; 2) interference avoidance (e.g., achieving suppression or a null at a specified receiver 120, 220 antenna); 3) facilitating simple MIMO processing at the receiver 120, 220 by achieving orthogonal signals at a receiver 120, 220 with a dual polarized antenna; 4) achieving reduced or zero polarization dispersion across the signal bandwidth, and other strategies. Several of these adaptive schemes may have relevance to monostatic radar processing, where CSIT can readily be measured at the radar after each pulse (or as needed) in order to adapt subsequent transmit polarizations to enhance system performance. These strategies may be applied to the radar detection problem.

RF multipath channels typically exhibit both polarization mode dispersion and polarization dependent loss. Due to the impact of polarization dependent loss, power transfer between the transmitter 110, 210 and receiver 120, 220 may depend upon the transmit polarization state. The transmit polarization state that optimizes power transfer through the channel will depend upon the particular frequency component of the signal. Therefore, by adapting the transmit polarization state versus frequency, increased or maximum power transfer may be achieved as a function of frequency through a multipath channel for a particular radar resolution cell. In the acquisition phase, the transmit signal waveform may be used to interrogate a large number of different resolution cells. Since each resolution cell may exhibit different multipath structure, the method may not yield an optimal response for each resolution cell, but rather for a single cell. For these reasons, this method may not be particularly relevant to the acquisition phase. But the methods may be more suitable for the track mode.

When a track is established, the transmit signal waveform can be designed specifically to improve or optimize the power transfer associated with the target cell. It is important to note that SNR maximization techniques will not necessarily improve target detection performance in clutter-limited environments. However, transmit polarization control may facilitate improvement or maximization of target returns relative to the clutter, for example by measuring the statistics of the clutter in adjacent resolution cells and setting the transmit polarization accordingly. Additionally, receiver processing, such as polarization-based nulling could also be applied to enhance discrimination. Any polarization changes imparting amplitude and phase modulations on the radar waveform will generally modify the transmitted spectrum and may require equalization at the receiver 120, 220 to limit their effects on pulse compression gains. Such effects can be reduced or eliminated through the use of diversity transmission, where orthogonal transmit polarizations are transmitted in a manner that they can be separated at the receiver 120, 220. Virtual transmit control can be achieved at the receiver 120, 220 by using weighted combinations of the separable responses to the transmit signals. In summary:

Direct transmit polarization control may be valid only for a single resolution cell since each cell may have a different multipath structure. Therefore, direct transmit polarization control may be best suited for the target tracking mode.

A more flexible solution may be to provide coherent H/V transmit schemes that are separable at the receiver 120, 220 so that any arbitrary transmit polarization can be reconstructed at the receiver using the techniques described herein. This provides flexibility and also provides a form of diversity.

Polarization control for SNR enhancement may not be useful in clutter-limited environments. Polarization control for target/clutter discrimination would likely be more useful. Schemes to determine appropriate polarization values would have to be tested. For example, polarization values could be keyed to the target-free resolution cells about the target resolution cell.

Interference avoidance may involve controlling the transmit polarization to elicit a null response in one of the antenna ports at the receiver 120, 220. The method conventionally requires channel knowledge in order to adaptively set the transmit polarization state. To obtain this channel state information in the case of radar, the response associated with each resolution cell would need to be measured from the returns, and in general, the channel response from these resolution cells would be different. As with SNR maximization, when direct polarization modulation of the transmit waveform is applied, nulls for each resolution cell cannot be simultaneously programmed onto the waveform (i.e., a null can only be established in a single resolution cell). Thus, the approach of using a directly modulated transmission may not be useful in acquisition modes, but perhaps could be used in tracking modes to help elicit target features from a known target cell.

A more flexible approach to achieving an interference avoidance capability for all resolution modes is to design the transmit signal with phase-coherent, orthogonally-polarized transmissions that are separable at the receiver 120, 220 (e.g., separable in time or frequency sub-band), as discussed herein. The receiver 120, 220 can then employ digital signal processing, such as the weighted combining techniques described herein, to achieve interference avoidance on all of its receive ports and for all resolution cells. This is a capability that generally could not be achieved through direct modulation of the transmit waveform.

Another possible strategy in adaptive transmission systems is to control the transmit polarization state to achieve a signal at the receiver 120, 220 exhibiting zero polarization dispersion. In other words, the received signal would have an identical polarization state across the entire signal bandwidth. For a given polarization-compensated transmitted signal, this could be achieved only for a single resolution cell, and so would appear to be mostly useful in target tracking modes. By employing a transmission employing separable phase-coherent V and H modes, as described herein, processing at the receiver 120, 220 could be employed to achieve zero dispersion for all resolution modes.

Consideration of adaptive transmission techniques and the unique capability of radar operation to interrogate multiple resolution signals using a single waveform leads to an important conclusion that adaptive transmission, when directly applied at the transmitter 110, 210, is useful particularly in the tracking mode. However a more flexible option is to employ phase-coherent, simultaneous, orthogonally-polarized transmit signals that are separable in time or frequency sub-bands or through the use of codes, such as binary repetition codes applied to repeated copies of waveforms, (or any other convenient space) so that the receiver 120, 220 can reconstruct arbitrary transmit polarization conditions through a weighted combinations of the separable responses to the transmit signals, as discussed herein. This leads to the possibility of employing these techniques so that each radar resolution cell could potentially benefit from adaptive polarization transmission techniques.

Systems and methods for leveraging separable transmit waveforms in a coherent multi-port transmitter, with or without a coherent multi-port receiver is disclosed herein. The disclosed techniques allow for digital control over the relative weightings of the responses associated with the transmit signals in order to simulate control of the transmit polarization state and beamforming. If a coherent multi-port receiver is also employed, digital combining of signals can also be used to control the received polarization and beamforming states. The methods enable control that can be used in monostatic and bistatic radar, communications, and sensing. Additionally, these concepts can equally apply to other types of signals, including signals carried by various types of electromagnetic radiation such as infrared or visible light signals, ultraviolet signals, or x-ray signals. In addition, the concepts described herein can apply to transmission lines or to signals carried by other types of wave phenomena besides electromagnetism, such as acoustic signals, etc. Furthermore, in place of, or in addition to antennas to measure the electric field, alternative sensors could be employed to measure the magnetic field. Thus, the systems described herein can be adapted to operate using different types of signals.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

The systems and methods described herein can advantageously be implemented using, for example, computer software, hardware, firmware, or any combination of software, hardware, and firmware. Software modules can comprise computer executable code for performing the functions described herein. In some embodiments, computer-executable code is executed by one or more general-purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on computer-readable media (e.g., optical disks such as CDs or DVDs, hard disk drives, flash memories, diskettes, or the like) that, when read by a computer or other processing device, cause it to carry out the method.

Multiple distributed computing devices can be substituted for any one computing device illustrated herein. In such distributed embodiments, the functions of the one computing device are distributed such that some functions are performed on each of the distributed computing devices.

While certain embodiments have been explicitly described, other embodiments will become apparent to those of ordinary skill in the art based on this disclosure. Therefore, the scope of the invention is intended to be defined by reference to the claims and not simply with regard to the explicitly described embodiments.

APPENDIX 1

Input-to-Output Instantaneous Polarization Characterization

This appendix describes a method for representing arbitrary transmit polarization states, channel impacts, and the resulting received instantaneous polarization states. The development employs two formalisms: one based on Jones calculus that involves Jones vectors and Jones matrices; and the Mueller calculus that involves Stokes parameters and Mueller matrices. Based on the limitations associated with both, an augmented approach is proposed that involves representations through frequency-dependent characterizations. Experiments are conducted that demonstrate the validity of the modeling approach.

I. Introduction

Polarization-diverse antenna architectures in modern communications systems serve to illustrate the growing interest in polarization to augment RF system performance. The modeling and representation of electromagnetic signal polarization effects will become more important as these architectures and associated signal features are leveraged for different applications. Polarization features can be represented using different modeling approaches such as statistical models, including those based on empirical measurements; geometry-based models such as ray tracing that require detailed modeling of the propagation media; and deterministic models, again including those based on measurements. The use case for each approach is different. We focus on deterministic models to characterize the instantaneous polarization state from measurements. Such models are known to be useful in specific applications, for example adaptive polarization transmission in optical communications systems to minimize differential group delay; adaptive transmission in RF systems to minimize co-channel interference at a receiver; and receiver-based interference suppression processing.

In wireless communications systems, one of the most often utilized measures for characterizing polarization channels is cross-polarized discrimination (XPD), which is defined as the ratio of the average matched polarization signal power to the cross-polarized signal power at the receiver due to polarization coupling that occurs in the channel. This modeling approach is often utilized to characterize average power coupling associated with multipath clusters in channel models, such as the 3GPP model and other wireless standards models, and has found useful application. This statistical measure, however, is not suited to accurately characterize instantaneous polarization behavior in multipath channels.

In this paper, we describe representations to characterize the instantaneous polarization state behavior using sub-banded signal partitions. The signal polarization input-to-output behavior in each sub-band is initially described using Jones and then Mueller matrices, providing capability to determine the received signal polarization behavior for arbitrary transmit polarization states. These characterizations, however, require some form of channel sounding, for example with known transmitted waveforms, to determine the frequency-dependent transfer functions between the transmit signal ports and the receive ports. An alternative, but related representation that we develop is an input-to-output polarization characterization model based on polarization mode dispersion (PMD) and polarization dependent loss (PDL). PMD is defined as a spread in the polarization state as a function of frequency that results from multipath channels simultaneously exhibiting delay spread and depolarization. In such channels, the polarization state of the received signal will vary with frequency in a correlated fashion. Frequency-selective channels will also exhibit polarization dependent loss (PDL). These losses depend not only on the transmit polarization but also on the subcarrier frequency. PDL implies a polarization-dependent power coupling loss through the channel, which is predicated on unequal eigenvalues in the channel matrix product $J(k)J^H(k)$. This condition will virtually always be satisfied in multipath environments. The PDL/PMD signal representation for a given transmit polarization may be derived directly from the received signal without knowledge of either the transmitted signal or the multipath structure. Note that the frequency-dependent characterizations for PMD/PDL, Jones, and Mueller formalisms all presume sub-bands that exhibit largely flat fading, and therefore virtually no signal depolarization. Hence, they operate exclusively on sub-band signals possessing high degrees of polarization.

Figure 12:
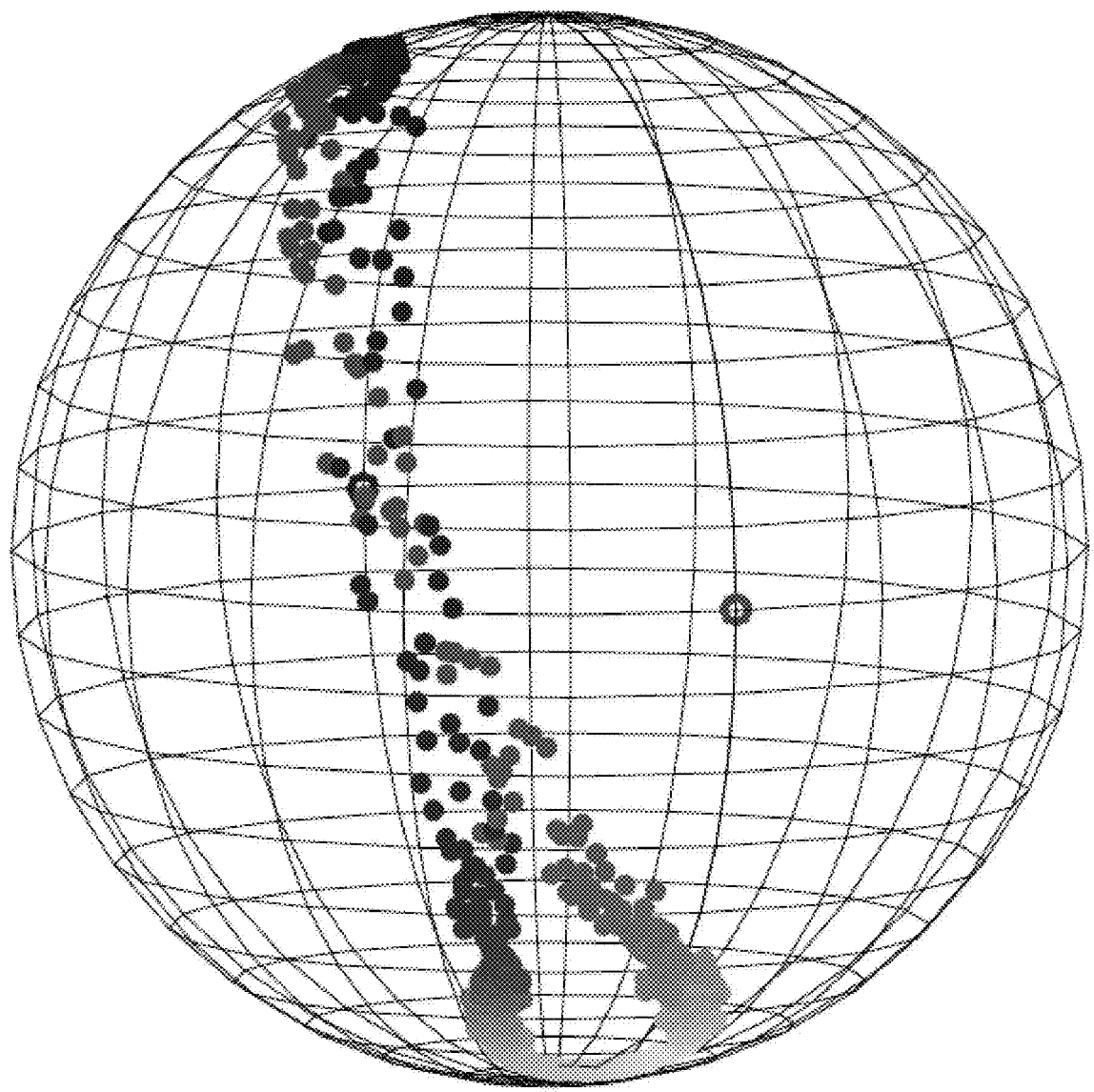
FIG. 12 is an example of a measured polarization mode dispersion curve plotted on the Poincaré sphere.

An example of a PMD characterization derived from measurements of a satellite signal using a ground-based satellite dish is shown in FIG. 12 using normalized Stokes parameters on the Poincaré sphere. The Poincaré Sphere is a unit sphere that facilitates representation of polarization states, where every point on the sphere corresponds to a unique polarization state, and where all polarization states are represented. FIG. 12 is an example of a Measured PMD Trajectory from a Satellite Signal over a 50 MHz Bandwidth. The plot shows the polarization state changes as a function of frequency on a Poincaré sphere. It is evident that a single-polarized antenna cannot capture the available energy from the received signal since the polarization state of the received signal varies as a function of frequency due to the effect of the multipath. On the other hand, a dual polarized antenna captures the available energy. Without some knowledge of the transmitted signal, such as a preamble or other training symbols, channel estimation cannot readily be performed to acquire a Jones matrix or a Mueller matrix representation. However, from the received signals, it is possible to estimate the coherency matrix of Wolf, which provides a time-domain characterization of the polarization state, but this characterization is variant with transmit signal properties and will usually exhibit degrees of polarization less than unity. Instead, we propose the use of block processing with Digital Fourier transforms (DFTs) to elicit polarization information as a function of frequency sub-bands, leading to PMD/PDL characterizations that are invariant with the power spectral content of the transmitted signal. The phenomena of PMD and PDL are recognized particularly in the single mode optical fiber communications community, where input-output characterizations based on "first order" models are used to characterize the differential group delay (DGD) between polarization modes, a parameter which limits data throughput. Wireless channels similarly exhibit PMD and PDL, albeit through different propagation phenomena, and wireless signals can be represented using a related input/output perspective, but more generally without the assumption of first-order behavior.

II. Polarization Input-Output Models

Signal polarization input-to-output behavior can be represented through methods based on fields, such as with the Jones calculus, and methods based on their intensities, such as with Mueller calculus. Methods based on the Jones calculus deal with electric fields and provide an input-to-output representation using complex signal vectors comprising orthogonally-polarized modes. In a flat-fading channel, this relationship may be represented in the form $$\begin{bmatrix} E_v^{out} \\ E_h^{out} \end{bmatrix} = \begin{bmatrix} h_{vv} & h_{hv} \\ h_{vh} & h_{hh} \end{bmatrix} \begin{bmatrix} E_v^{in} \\ E_h^{in} \end{bmatrix} = J \begin{bmatrix} E_v^{in} \\ E_h^{in} \end{bmatrix} \quad (1)$$

where $E_v$ and $E_h$ are the E-fields corresponding to orthogonally polarized signal components, and where $h_{xy}$ corresponds to the transfer gain from the x-polarized transmission to the y-polarized receiver. The polarization state at the transmitter and at the receiver may be defined directly from the orthogonally-polarized fields using various parameter sets. One example is the $(\gamma, \phi)$ representation on the Poincaré Sphere shown in FIG. 12, where $$\gamma = 2\tan^{-1}\left|\frac{E_v}{E_h}\right| \quad (2)$$

$$\phi = \angle E_v - \angle E_h \quad (3)$$

The Jones matrix formulation in Equation 1 has the well-known limitation that it does not represent signals with an arbitrary degree of polarization, although this is not a barrier for its adaptation in our sub-banded approach since bandwidths are selected to ensure high degrees of polarization. Recall that the polarization state is defined over a time interval and signal bandwidth. The degree of polarization is a feature that indicates the level of depolarization of a signal, for example, if the polarization state changes during the observation time or exhibits polarization changes across the signal bandwidth. By employing sub-bands that are sufficiently narrow in bandwidth, a high degree of polarization can be assured.

In contrast to the Jones calculus, the Mueller formulation is based on intensities rather than fields. Stokes vectors are used to describe the input and output signal polarization features and Mueller matrices are used to describe input-to-output behavior between these vectors, i.e., $$S_{RX} = M S_{TX} \quad (4)$$

It is generally regarded that un-polarized or partially polarized signals must be treated with Mueller calculus, while fully-polarized signals can be addressed using either Mueller or Jones formulations. It is further accepted that Jones calculus retains information about the phase, whereas Stokes vectors and Mueller matrices operate on intensities and their differences, and are not suited to describe interference or diffraction effects.

This generalization, however, may be unnecessarily rigid. Prior work has shown that with a suitable number of intensity measurements made over sub-bands of the signal, the polarization state features associated with a depolarizing channel can be represented accurately. Building upon that realization, we propose an input-to-output modeling approach based on frequency-dependent Mueller matrices that is capable of representing frequency-selective impacts. Since the proposed modeling approach ultimately deals with sub-band signals exhibiting high degrees of polarization, representations with either the Jones or Mueller calculus is possible. The proposed extension to traditional Mueller and Jones formalisms enables their use to address instantaneous signal polarization characterizations in frequency-dependent channels such as multipath channels and channels with frequency-selective surfaces.

Traditional Mueller matrix analyses estimate the polarization features of the signal in the time domain, which neglects the frequency-dependent polarization behavior of the received signal that can occurs in some propagation environments. We propose to employ a different representation that makes use of polarization-frequency behaviors, characterizing Jones vectors, Jones matrices, Stokes vectors, and Mueller matrices, as a function of the received signal frequency components.

A. Input-to-Output Signal Representation: Jones Calculus

Assume that a signal s(t) is transmitted through a vertically-polarized antenna and propagates through a medium having a vector channel impulse response $h_v$ that is constant over the duration of the polarization characterization measurement. Further consider that the signal, along with delayed and scaled multipath versions of the signal, impinge on a receiver with a dual orthogonally-polarized antenna. The received signal vector at the output of the antenna ports may then be represented as $$\begin{bmatrix} y_{vv}(t) \\ y_{vh}(t) \end{bmatrix} = s(t) * h_v \quad (5)$$

where the subscript on vector channel h corresponds to the transmit polarization, and the subscripts of y correspond to the transmit and receive matched polarizations, respectively. Similarly, if the signal is instead transmitted through a horizontally-polarized antenna and propagates through a medium having a vector channel impulse response $h_h$, the received signal at the output of the antenna may be represented as $$\begin{bmatrix} y_{hv}(t) \\ y_{hh}(t) \end{bmatrix} = s(t) * h_h \quad (6)$$

In general, the transmit polarization can be arbitrary and can be represented as a linear combination of a basis consisting of two orthogonally-polarized signals. Without loss of generality, we assume a basis of vertical and horizontal polarization alignments. The linear combination is represented through a Jones vector, $\rho = [\rho_v \rho_h]^T$, to designate the transmit polarization state, which is assumed to be constant over the dwell, where $\rho_v$ and $\rho_h$ are complex with $|\rho_v|^2 + |\rho_h|^2 = 1$. The resulting system equation is given by:

$$\begin{bmatrix} y_{\rho v}(t) \\ y_{\rho h}(t) \end{bmatrix} = [h_v \; h_h] \begin{bmatrix} \rho_v \\ \rho_h \end{bmatrix} * s(t) \quad (7)$$

from which the instantaneous output polarization state can be obtained, using for example, $$\gamma(t) = 2\tan^{-1}\left|\frac{y_{\rho v}(t)}{y_{\rho h}(t)}\right| \quad (8)$$

$$\phi(t) = \angle y_{\rho v}(t) - \angle y_{\rho h}(t) \quad (9)$$

For a fixed transmit polarization, the polarization state of the received signal can vary with time, depending on the convolution of the channel impulse responses with the transmitted signal.

B. Input-to-Output Signal Polarization Representation: Mueller Calculus

A corresponding input-to-output signal polarization representation is achieved using input and output Stokes vectors and a Mueller matrix. The input Stokes vector may be obtained directly from the input Jones vector. For flat fading channels, the Mueller matrix may be computed from the Jones matrix.

The output Stokes vector is a product of the input Stokes vector and the Mueller matrix. In the following subsections, we develop the relationship between Mueller and Jones matrices in flat fading channels. We then consider their extension to frequency selective channels first by considering time domain representations and then frequency domain representations. Here we consider both flat-fading and frequency-selective channels.

1) Time-Domain Mueller Matrix: Flat Fading Case: In the case of a narrowband (flat-fading) channel where the relative delays are small in comparison to the inverse of the signal bandwidth, the channel impulse response vector components may be represented by a single tap delay with a corresponding complex gain, i.e., $$h_v(t) = \begin{bmatrix} h_{vv}\delta(t-\tau) \\ h_{vh}\delta(t-\tau) \end{bmatrix} \quad (10)$$

and $$h_h(t) = \begin{bmatrix} h_{hv}\delta(t-\tau) \\ h_{hh}\delta(t-\tau) \end{bmatrix} \quad (11)$$

so that $$\begin{bmatrix} y_{vv}^{NB}(t) \\ y_{vh}^{NB}(t) \end{bmatrix} = \begin{bmatrix} h_{vv} \\ h_{vh} \end{bmatrix} s(t-\tau) \quad (12)$$

and $$\begin{bmatrix} y_{hv}^{NB}(t) \\ y_{hh}^{NB}(t) \end{bmatrix} = \begin{bmatrix} h_{hv} \\ h_{hh} \end{bmatrix} s(t-\tau) \quad (13)$$

The polarimetric response of the channel can be characterized as a function of a Jones matrix $J(t) \in \mathbb{C}^{(2 \times 2)}$:

$$\begin{bmatrix} y_{\rho v}^{NB}(t) \\ y_{\rho h}^{NB}(t) \end{bmatrix} = J(t)\rho s(t-\tau) \quad (14)$$

where $$J(t) = \begin{bmatrix} h_{vv} & h_{hv} \\ h_{vh} & h_{hh} \end{bmatrix} \quad (15)$$

represents the Jones matrix for the given propagation environment. The Stokes vector describing the polarization of the transmitted signal is given by $$S_{TX} = A(\rho \otimes \rho^*) = Ac \qquad (16)$$

where $$A = \begin{bmatrix} 1 & 0 & 0 & 1 \\ 1 & 0 & 0 & -1 \\ 0 & 1 & -1 & 0 \\ 0 & -i & i & 0 \end{bmatrix} \qquad (17)$$

and $$c(t) = \rho \otimes \rho^* = \begin{bmatrix} \rho_v \rho_v^* \\ \rho_h \rho_v^* \\ \rho_v \rho_h^* \\ \rho_h \rho_h^* \end{bmatrix} \qquad (18)$$

The Mueller matrix, $M \in \mathbb{R}^{(4\times4)}$, is given by $$M = A(J \otimes J^*)A^{-1} \qquad (19)$$

and the received signal is given by $$S^{RX} = A((J\rho) \otimes (J\rho)^*) = A(J \otimes J^*)(\rho \otimes \rho^*) \qquad (20)$$
$$= A(J \otimes J^*)A^{-1}S_{TX} = MS_{TX}$$

This is the form traditionally found in textbooks.

2) *Time-Domain Mueller Matrix: Frequency-Selective Case:* In the case of a frequency-selective channel, the channel exhibits a delay spread that is a substantial fraction of the inverse of the signal bandwidth. For ease of exposition, we represent the frequency-selective channel as an L-tap FIR filter:

$$h_v^{WB}(t) = \begin{bmatrix} \sum_{l=1}^{L} h_{vv,l}\delta(t - \tau_l) \\ \sum_{l=1}^{L} h_{vh,l}\delta(t - \tau_l) \end{bmatrix} \qquad (21)$$

$$h_h^{WB}(t) = \begin{bmatrix} \sum_{l=1}^{L} h_{hv,l}\delta(t - \tau_l) \\ \sum_{l=1}^{L} h_{hh,l}\delta(t - \tau_l) \end{bmatrix} \qquad (22)$$

The channel response to a transmit signal $s(t)$ having arbitrary polarization $\rho$ is $$\begin{bmatrix} y_{\rho v}^{WB}(t) \\ y_{\rho h}^{WB}(t) \end{bmatrix} = \begin{bmatrix} \sum_{l=1}^{L} h_{vv,l}\delta(t-\tau_l) & \sum_{l=1}^{L} h_{hv,l}\delta(t-\tau_l) \\ \sum_{l=1}^{L} h_{vh,l}\delta(t-\tau_l) & \sum_{l=1}^{L} h_{hh,l}\delta(t-\tau_l) \end{bmatrix} \begin{bmatrix} \rho_v \\ \rho_h \end{bmatrix} * \qquad (23)$$

$$s(t) = \begin{bmatrix} \sum_{l=1}^{L} h_{vv,l}s(t-\tau_l) & \sum_{l=1}^{L} h_{hv,l}s(t-\tau_l) \\ \sum_{l=1}^{L} h_{vh,l}s(t-\tau_l) & \sum_{l=1}^{L} h_{hh,l}s(t-\tau_l) \end{bmatrix} \begin{bmatrix} \rho_v \\ \rho_h \end{bmatrix} = \tilde{J}^{WB}(t)\rho$$

where $\tilde{J}^{WB}(t)$ is the convolution of the frequency selective channel with the transmitted signal. In the time domain, the convolution does not facilitate a factored relationship between the channel and the signal. In fact, the elements of $\tilde{J}^{WB}(t)$ can be time varying due to the effect of the transmitted signal. If we treat $\tilde{J}^{WB}(t)$ as an "effective" Jones matrix, translation to a Mueller representation is given by $$M^{WB}(t) = A(\tilde{J}^{WB}(t) \otimes (\tilde{J}^{WB}(t))^*)A^{-1} \qquad (24)$$

which, when averaged over time, yields $$\overline{M}^{WB} = \int M^{WB}(t)dt \qquad (25)$$
$$= \int A(\tilde{J}^{WB}(t) \otimes (\tilde{J}^{WB}(t))^*)A^{-1}dt$$

In the frequency-selective case, we note that the resulting Mueller matrix, and hence the polarization state, is time varying due to the impact of the addition of delayed and scaled versions of $s(t)$ incident at the receiver. Consequently, the Mueller matrix exhibits polarization dispersion over the measurement period, and the effects of the frequency-selective channel are averaged in the computation of the Mueller matrix.

An alternative characterization is possible by considering a frequency-domain representation. This latter representation provides the basis for the polarization modeling approach being proposed in this work.

3) *Frequency-Domain Mueller Matrix Representation:* Recalling the Fourier transform pair for discrete sequences:

$$x[n] = \lim_{\Delta\omega \to 0} \frac{1}{2\pi} \sum_k (e^{jk\Delta\omega})e^{jk\Delta\omega n}\Delta\omega \qquad (26)$$
$$= \frac{1}{2\pi}\int_{-\pi}^{\pi} X(e^{j\omega})e^{j\omega n}d\omega$$

$$X(e^{j\omega}) = \sum_{n=-\infty}^{\infty} x[n]e^{-j\omega n} \qquad (27)$$

and the definition of discrete-time convolution $$y[n] = \sum_{m=-\infty}^{\infty} x[n-m]h[m] \qquad (28)$$

the eigenfunction property of complex exponentials can be shown. Let the input be a complex exponential, $$x[n] = e^{j\omega n}. \qquad (29)$$

Then the output is $$y[n] = \sum_{m=-\infty}^{\infty} e^{j\omega(n-m)}h[m] \qquad (30)$$
$$= e^{j\omega n}\sum_{m=-\infty}^{\infty} h[m]e^{-j\omega m}$$
$$= e^{j\omega n}H(e^{j\omega})$$

which illustrates that the resulting output is the product of the exponential and the transfer function of the channel at the same frequency of the exponential. Therefore, for a general input x[n] whose transform is $$x[n] = \frac{1}{2\pi}\int_{-\pi}^{\pi} X(e^{j\omega})e^{j\omega n}d\omega \quad (31)$$

$$= \lim_{\Delta\omega \to 0} \frac{1}{2\pi}\sum_k X(e^{jk\Delta\omega})e^{jk\Delta\omega n}d\omega$$

it follows that the output is $$y[n] = \sum_{m=-\infty}^{\infty} x[n-m]h[m] \quad (32)$$

$$= \lim_{\Delta\omega \to 0} \frac{1}{2\pi}\sum_k H(e^{jk\Delta\omega})X(e^{jk\Delta\omega})e^{jk\Delta\omega n}\Delta\omega$$

$$= \frac{1}{2\pi}\int_{-\pi}^{\pi} H(e^{j\omega})X(e^{j\omega})e^{j\omega n}d\omega$$

which we recognize to have the form of one of the Fourier Transform pairs, implying that $$Y(e^{j\omega}) = H(e^{j\omega})X(e^{j\omega}) \quad (33)$$

Beginning with a discrete version of the system equation, i.e., $$\begin{bmatrix} y_{\rho\upsilon}^{WB}(n) \\ y_{\rho h}^{WB}(n) \end{bmatrix} = \begin{bmatrix} \sum_{l=1}^{L} h_{\upsilon\upsilon,l}\delta(n-\tau_l) & \sum_{l=1}^{L} h_{h\upsilon,l}\delta(n-\tau_l) \\ \sum_{l=1}^{L} h_{\upsilon h,l}\delta(n-\tau_l) & \sum_{l=1}^{L} h_{hh,l}\delta(n-\tau_l) \end{bmatrix}\begin{bmatrix} \rho_\upsilon \\ \rho_h \end{bmatrix} * s(n) \quad (34)$$

The corresponding frequency-domain representation is:

$$\begin{bmatrix} Y_{\rho\upsilon}^{WB}(e^{j\omega}) \\ Y_{\rho h}^{WB}(e^{j\omega}) \end{bmatrix} = \begin{bmatrix} H_{\upsilon\upsilon}(e^{j\omega}) & H_{h\upsilon}(e^{j\omega}) \\ H_{\upsilon h}(e^{j\omega}) & H_{hh}(e^{j\omega}) \end{bmatrix}\begin{bmatrix} \rho_\upsilon \\ \rho_h \end{bmatrix}S(e^{j\omega}) \quad (35)$$

where $$H_{\upsilon\upsilon}(e^{j\omega}) = \sum_{n=-\infty}^{\infty}\sum_{l=1}^{L} h_{\upsilon\upsilon,l}\delta(n-\tau_l)e^{-j\omega n} \quad (36)$$

$$= \sum_{l=1}^{L} h_{\upsilon\upsilon,l}e^{-j\omega\tau_l}$$

and similar relationships hold for the hv, vh, and hh components. In practice, it is often more convenient to work with the discrete Fourier Transform for finite sequences. The DFT transform pairs are given by:

$$\tilde{x}[n] = \frac{1}{N}\sum_{k=0}^{N-1} \tilde{X}[k]W_n^{-kn} \quad (37)$$

and $$\tilde{X}[k] = \sum_{n=0}^{N-1} \tilde{x}[n]W_n^{kn} \quad (38)$$

where x is assumed to be periodic extensions of a finite sequence of length N, and X is the corresponding periodic sequence of discrete Fourier series coefficients. The DFT series coefficients may be found by sampling the Fourier transform at the evenly-spaced discrete frequencies $$\omega_k = \frac{2\pi k}{N}, k = 0, 1, \ldots, N-1 \quad (39)$$

leading to $$\begin{bmatrix} Y_{\rho\upsilon}^{WB}(e^{j\frac{2\pi k}{N}}) \\ Y_{\rho h}^{WB}(e^{j\frac{2\pi k}{N}}) \end{bmatrix} = \begin{bmatrix} H_{\upsilon\upsilon}(e^{j\frac{2\pi k}{N}}) & H_{h\upsilon}(e^{j\frac{2\pi k}{N}}) \\ H_{\upsilon h}(e^{j\frac{2\pi k}{N}}) & H_{hh}(e^{j\frac{2\pi k}{N}}) \end{bmatrix}\begin{bmatrix} \rho_\upsilon \\ \rho_h \end{bmatrix}S(e^{j\frac{2\pi k}{N}}) \quad (40)$$

or in different notation _

$$\begin{bmatrix} Y_{\rho\upsilon}^{WB}(k) \\ Y_{\rho h}^{WB}(k) \end{bmatrix} = \begin{bmatrix} H_{\upsilon\upsilon}(k) & H_{h\upsilon}(k) \\ H_{\upsilon h}(k) & H_{hh}(k) \end{bmatrix}\begin{bmatrix} \rho_\upsilon \\ \rho_h \end{bmatrix}S(k) \quad (41)$$

$$= J^{WB}(k)\rho S(k)$$

We see that this leads to a set of Jones matrices, $J^{WB}(k)$, k=0, 1, . . . , N−1, one for each of the Discrete Fourier Series coefficients, and to a corresponding set of Mueller matrices:

$$M^{WB}(k) = A(J^{WB}(k) \otimes (J^{WB}(k))^*)A^{-1} \quad (42)$$

For a fixed transmit polarization state, ρ, the frequency-dependent Mueller matrix implies that the resulting received polarization state will also be frequency-dependent. In the time-domain representation discussed in the prior subsection, these effects are averaged in the computation of the Mueller matrix. But in the frequency domain representation, the polarization states are explicitly determined for each of the frequency sub-bands, leading to a family of Mueller matrices that characterize the system's polarimetric response.

4) Output Signal Characterization: From the frequency-dependent Mueller matrix and the input Stokes vector, it is possible to characterize the output polarization state over the measurement interval using Equation 4. The Mueller matrices in this representation correspond to the set of contiguous sub-bands across the transmitted signaling band. Depending upon the channel characterization, the application of the Mueller matrices to a purely polarized transmit signal can lead to an output signal representations having a DOP less than unity. However, if the sub-band spacing are selected to be sufficiently small (as we do in OFDM applications), the DOP of the output signal associated with each sub-band will be near unity, and hence both Mueller and Jones representations will apply (at least approximately) for each of the sub-band signals. From this frequency-dependent representation, we may achieve full polarization characterizations that enable prediction of instantaneous polarization states as a function of frequency and transmit polarization.

C. PMD/PDL Representation

1) Polarization Mode Dispersion: The PMD-based representation is characterized by the estimated polarization-frequency response at the receiver for the given transmit polarization state.

Let $Y^x(k) = [Y_{\rho\upsilon}^x(k) \ Y_{\rho h}^x(k)]^T$ represent the received signal vector at subcarrier k for a signal with input Stokes vector $S_t^x$. The corresponding output Stokes vector, $S_r^x(k)$, for the received signal vector associated with subcarrier k may be obtained from the coherency matrix $$C^x(k) = \begin{bmatrix} C_{11}^x(k) & C_{12}^x(k) \\ C_{21}^x(k) & C_{22}^x(k) \end{bmatrix} = E[Y^x(k)(Y^x(k))^H] \quad (43)$$

using $$S_r^x(k) = \begin{bmatrix} C_{11}^x(k) + C_{22}^x(k) \\ C_{11}^x(k) - C_{22}^x(k) \\ C_{12}^x(k)(C_{21}^x(k))^* + C_{21}^x(k)(C_{12}^x(k))^* \\ j(C_{12}^x(k)(C_{21}^x(k))^* - C_{21}^x(k)(C_{12}^x(k))^*) \end{bmatrix} \quad (44)$$

The polarization states associated with the collection of subcarrier channel responses define the PMD response of the channel for the given transmit polarization. We designate this PMD trajectory as the set $$\Gamma_x = \{S : S \in S_r^x(k), k \in \{0, 1, \ldots, K-1\}\} \quad (45)$$

The members in this set are the received polarizations $S_r^x(k)$ due to transmitted polarization $S_t^x$ for all subcarriers $k \in \{1, 2, \ldots, K\}$. Note that the characterizations can be normalized or un-normalized. Normalized representations confine the representations to the unit sphere and do not retain amplitude or degree of polarization information. Un-normalized Stokes vectors are not confined to the unit sphere, but provide PDL information and retain degree of polarization information.

Figure 13:
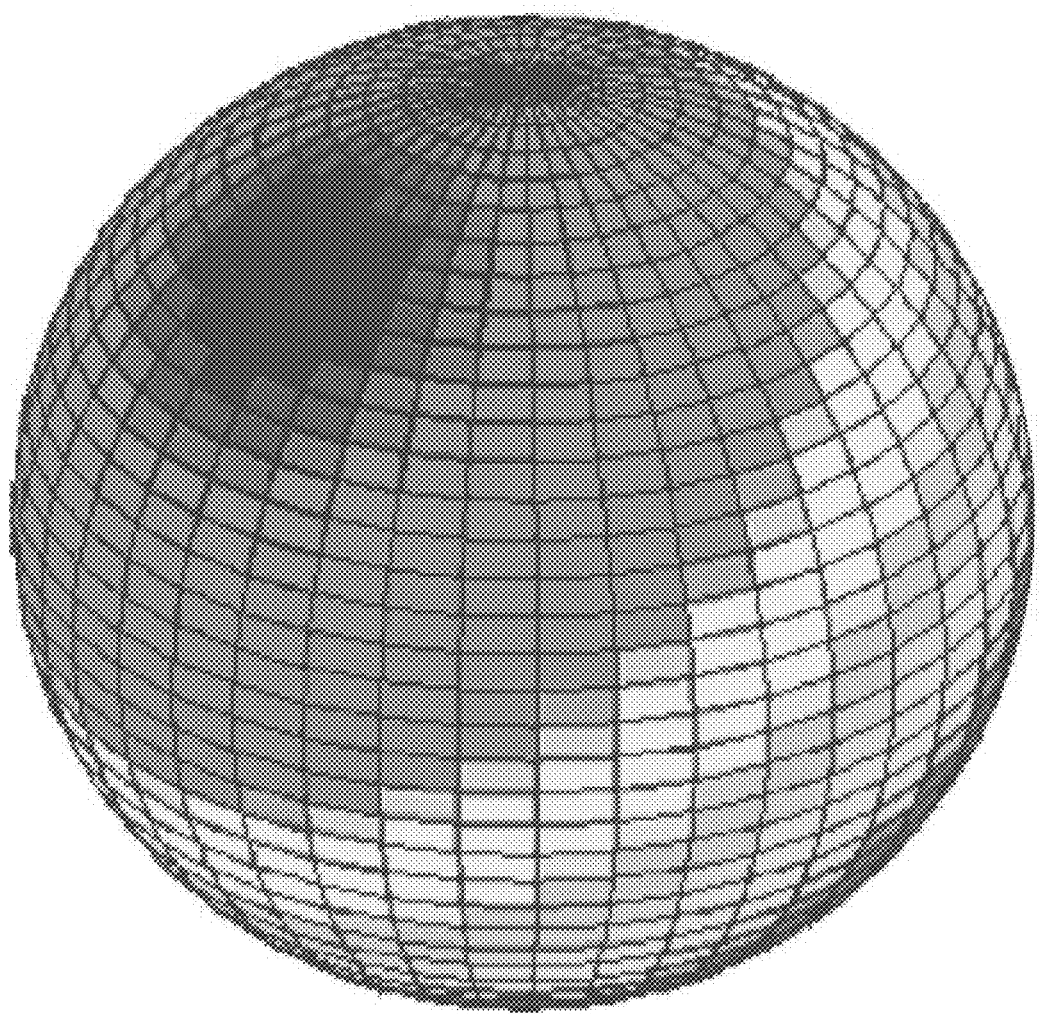
FIG. 13 shows how the power transferred to the receiver may be dependent upon the polarization of the transmit signal.

2) Polarization Dependent Loss: A second channel impairment that is incurred in wireless channels is PDL, which defines the polarization-sensitive power coupling behavior of the channel. For the kth subcarrier, PDL is defined as $$PDL_k = 10 \log_{10}(\lambda_{k,max}/\lambda_{k,min}) \quad (46)$$

where $\lambda_{k,max}$ and $\lambda_{k,min}$ are the maximum and minimum eigenvalues associated with the matrix $J^{WB}(k)(J^{WB}(k))^H$ for subcarrier k, respectively. The magnitude of the PDL associated with each subcarrier is dictated by eigenvalues of the subcarrier channel matrix and the polarization state of the transmitted signal relative to the associated polarization eigenmodes. For each subcarrier, there exists a specific polarization state that optimizes power transfer through the given multipath channel. An example of the power coupling dependency on transmit polarization for a particular subcarrier is illustrated in FIG. 13, where the dark spot on the Poincare sphere corresponds to the transmit polarization yielding maximum power transfer through the channel. FIG. 13 (Polarization Dependent Loss) shows that for a given subcarrier, the power transferred to the receiver is dependent upon the polarization of the transmitted signal. By selecting the polarization state that maximizes the power transfer for each subcarrier, the signal power transferred through the channel may be optimized.

To summarize, the approach to polarimetric modeling that we have adopted involves characterizing the input-to-output polarization response of the channel as a function of frequency, which may be accomplished through PMD and PDL characterizations. The model that we ultimately propose involves the use of frequency-dependent un-normalized Stokes parameters, which jointly represents the effects of PMD and PDL.

D. Normalized Versus Un-Normalized Representations

In polarization representations involving signals with a high degree of polarization, it is common normalize the Stokes or Jones vectors since the signal magnitude has no bearing on the polarization state. Hence vectors are usually normalized such that $$\hat{q} = \begin{bmatrix} \hat{E}_v \\ \hat{E}_h \end{bmatrix} \quad (47)$$

$$= \frac{E_v^{in}}{\sqrt{|E_v^{in}|^2 + |E_h^{in}|^2}} \begin{bmatrix} 1 \\ 0 \end{bmatrix} + \frac{E_h^{in}}{\sqrt{|E_v^{in}|^2 + |E_h^{in}|^2}} \begin{bmatrix} 0 \\ 1 \end{bmatrix}$$

and $$\hat{S}_0 = \begin{bmatrix} \hat{S}_0 \\ \hat{S}_1 \\ \hat{S}_2 \\ \hat{S}_3 \end{bmatrix} = \frac{1}{|S_1|^2 + |S_2|^2 + |S_3|^2} \begin{bmatrix} S_0 \\ S_1 \\ S_2 \\ S_3 \end{bmatrix} \approx \begin{bmatrix} 1 \\ \hat{S}_1 \\ \hat{S}_2 \\ \hat{S}_3 \end{bmatrix} \quad (48)$$

Note however, that these normalized representations do not retain PDL information. Instead, by retaining the un-normalized vectors, both PMD and PDL can simultaneously be represented.

In section II-F, we use the un-normalized representation along with additional phase reference vectors to achieve full-polarization signal representations.

E. Full Polarization Characterization in Wireless Systems

Full-polarization characterizations, as used here, is understood to mean a characterization of the full channel matrix (i.e., the channel transfer functions) for all tx/rx polarization antenna pairs. With this full-polarization characterization comes the ability to estimate the received signal polarization for any transmit polarization and any subcarrier frequency. To obtain this representation, Jones matrices can be estimated (e.g., from measurements) using two orthogonally-polarized transmissions. These measurements can be obtained, for example, by using training symbols, such as those associated with channel estimation. This approach presupposes cooperation from the transmitter. Once the Jones matrices are determined, PMD and PDL responses for arbitrary transmit polarization states can be estimated.

For example, assuming orthogonal transmit polarization states $\hat{S}_x$ and $\hat{S}_y$ (using normalized Stokes parameters), the Jones matrix estimate for subcarrier k at the receiver may be represented as J(k). When the Jones matrix is computed for each subcarrier k, the output polarization state can be estimated for arbitrary input polarization state and any subcarrier frequency. This is readily accomplished by weighting the E field components according to the desired transmit polarization state, applying the Jones matrix associated with the subcarrier frequency of interest, and then computing the polarization states and losses from the output E field components.

An alternative full-polarization characterization may also be achieved with the Mueller matrix. Using Equation 19, the Mueller matrix M(k) may be computed from the Jones matrix for each subcarrier k, and theses matrices may then be used to estimate the output Stokes vector for arbitrary transmit polarization (represented through a Stokes vector) and subcarrier. Note that by their reliance on the Jones matrix, these usually presuppose training symbols or other forms of cooperation to accomplish channel estimation and polarization characterizations.

PMD representations form an alternative polarization characterization that may be obtained from either Jones, Mueller, or Wolf coherency matrix estimates. PMD representations for arbitrary orthogonally-polarized transmit polarization states (the x polarization state and the y polarization state, for example) may be represented by $\Gamma^x = \{\bar{S}^x(1), \bar{S}^x(2), \ldots, \bar{S}^x(N)\}$ and $\Gamma^y = \{\underline{S}^y(1), \underline{S}^y(2), \ldots, \underline{S}^y(N)\}$, respectively. These sets of Stokes vectors comprise loci characterizing the received signal polarization state across its signal bandwidth for orthogonal transmit polarization states. However, PMD responses from orthogonally-polarized transmissions alone are not sufficient to enable estimation of the output Stokes vector for arbitrary transmit polarization and do not explicitly characterize polarization-dependent losses. We shall address these shortcomings in the next section and show how full polarization characterizations can be achieved with PMD/PDL representations.

F. Parameter Estimation with Measurements

Full polarization characterizations derived from PMD loci require more information beyond the set of unnormalized Stokes vectors, $\Gamma^x$ and $\Gamma^y$, used to describe the polarization state versus subcarrier frequency for a pair of orthogonally polarized transmissions. In particular, relative phasing between responses from the orthogonally-polarized transmissions is not represented. Such information is essential to forming linear combinations that accurately reflect the transmit polarization state. In this section, we address modeling of the reference phase vectors and show that these vectors, when combined with unnormalized Stokes parameters, provide the augmented information needed to estimate receiver polarization states for arbitrary transmit polarizations and subcarrier frequencies. We begin with a development based on Jones matrix representations to achieve these augmented PMD/PDL representations, with the primary intention of showing that the representation enables estimation of polarization responses from linear combinations from the orthogonally-polarized transmission basis. We then proceed on an alternative characterization that relies on coherency matrix estimation. This approach does not rely on explicitly on training symbols, but does require the transmitter to transmit signals from the orthogonal basis components in a separable manner.

Assume that orthogonally-polarized antennas are used at both the transmitter and receiver, and that the transmit polarization states are represented as $\hat{\underline{S}}_x$ and $\hat{\underline{S}}_y$. The Jones transmission matrix can be estimated by transmitting a spectrally-flat signal over the band of interest, where the signal polarizations, $\underline{S}_x$ and $\underline{S}_y$, are interleaved in time or frequency. The receiver can then estimate the complex elements of the Jones transmission matrix for all sub-bands. We note that in contrast to optical systems, the Jones matrix can be estimated at each frequency sub-band using only two transmit polarizations.

1) Estimation with pilots: Estimation of the Jones matrix is easily accomplished if the transmitted signal is known, for example if a known preamble is employed, as is usually the case in wireless communications standards to enable channel estimation at the receiver. The receiver uses the known preamble to perform channel estimation and equalization to help minimize the impact of the channel. For example, in OFDM systems, a complex gain is estimated for each subcarrier, leading to channel transfer gains that are characterized as a function of frequency. The so-called channel state information represents the channel transfer gains and can be used directly in the Jones transmission matrix, i.e., $$\hat{J}(k) = \begin{bmatrix} H_{xx}(k) & H_{yx}(k) \\ H_{xy}(k) & H_{yy}(k) \end{bmatrix} \quad (49)$$

where the $H_{ij}$ are complex and represent the channel estimates from transmit polarization i to receiver polarization j. In general, the matrix will be frequency dependent if the channel is frequency selective. From this matrix, a linear combination of transmit signal components (to represent an arbitrary polarization) may be computed for any subcarrier k:

$$\begin{bmatrix} E_x^{out}(k) \\ E_y^{out}(k) \end{bmatrix} = \begin{bmatrix} H_{xx}(k) & H_{yx}(k) \\ H_{xy}(k) & H_{yy}(k) \end{bmatrix} \begin{bmatrix} \rho_x^{in} \\ \rho_y^{in} \end{bmatrix} S(k) \quad (50)$$

As described previously, un-normalized Stokes vectors $S_V$ and $S_H$ may be computed from the Jones vector outputs. It is possible to achieve a full-polarization representation from these un-normalized Stokes vectors. Coherency matrix elements may be computed from each of the Stokes vectors and used to arrive at a scaled version of the Jones vectors from which the Stokes vectors were computed. For the x polarization component, this is $$\hat{\Upsilon}^x(k) = \sqrt{B_g S_H(k)} B_{14} S_H(k)/|B_{14} S_H(k)| \quad (51)$$

and for the y polarization component, we obtain $$\hat{\Upsilon}^y(k) = \sqrt{B_g S_V(k)} B_{32} S_V(k)/|B_{32} S_V(k)| \quad (52)$$

where $$B_g = [1\ 0\ 0\ 0], \quad (53)$$

$$B_{14} = \frac{1}{2}\begin{bmatrix} 1 & 1 & 0 & 0 \\ 0 & 0 & 1 & -i \end{bmatrix}, \quad (54)$$

$$B_{32} = \frac{1}{2}\begin{bmatrix} 0 & 0 & 1 & i \\ 1 & -1 & 0 & 0 \end{bmatrix}, \quad (55)$$

Reference phasors, $\Xi_x$ and $\Xi_y$ that are needed to enable linear combining of Stokes responses from x and y transmissions may be obtained from:

$$\Xi_x(k) = H_{xx}(k)/|H_{xx}(k)| \quad (56)$$

$$\Xi_y(k) = H_{yx}(k)/|H_{yx}(k)| \quad (57)$$

where the $\Xi$ phasors are assumed to share a common phase reference.

These can be used with the PMD/PDL representations (i.e., un-normalized Stokes vectors) to provide full-polarization estimation capabilities. The linear combination associated with an arbitrary transmit polarization $[\rho_x\ \rho_y]$ may be formed using:

$$\hat{\Upsilon}^{out}(k) = \rho_x^{in}\Xi_x(k)\hat{\Upsilon}^x(k)\rho_y^{in}\Xi_y(k)\hat{\Upsilon}^y(k) \quad (58)$$

These in turn may be used to form the set of Stokes vectors comprising the PMD/PDL responses using $$\hat{\underline{S}}^{out}(k) = A(\hat{\Upsilon}^{out}(k) \otimes (\hat{\Upsilon}^{out}(k))^*). \quad (59)$$

2) Estimation without pilots: If training symbols or pilots are not available, the receiver can still estimate PMD/PDL responses directly from measurements, and potentially can form a phase-coherent full polarization matrix that would retain relative phase information among the subcarriers and between the orthogonally-polarized components to facilitate the formation of linearly-combined responses. Estimation of a Jones matrix with pairwise-coherent elements for the same source and for all subcarriers can be accomplished even if the orthogonally-polarized transmitted signals from the source are not known. Let $a_v^x=[a_v^x(1) \ldots a_v^x(N)]$ and $a_w^x=[a_w^x(1) \ldots a_w^x(N)]$ represent N-length sequences associated with the received signals for an x-polarized transmit signal. The corresponding frequency domain components are $A_v^x(k)$ and $A_w^x(k)$, for $k \in \{1, 2, \ldots, N\}$, where an FFT-based realization is assumed. At subcarrier k, the coherency matrix $\overline{C}^x(k)$ associated with transmit polarization x is formed as $$\overline{C}^x(k) = E\begin{bmatrix} \overline{C}_{11}^x(k) & \overline{C}_{12}^x(k) \\ \overline{C}_{21}^x(k) & \overline{C}_{22}^x(k) \end{bmatrix} \quad (60)$$
$$= E\begin{bmatrix} A_v^x(k)A_v^{x*}(k) & A_w^x(k)A_v^{x*}(k) \\ A_v^x(k)A_w^{x*}(k) & A_w^x(k)A_w^{x*}(k) \end{bmatrix}$$

The first column or the conjugate of the second column of Equation 60 can be used for the corresponding column in the estimated Jones matrix. Relative phase information across subcarriers may be computed using either element of the column, but the same element must be used consistently across the subcarriers. For the case of the x-polarized transmission, the phase information is computed via $$\phi^x(k) = \sum_{n=2}^{k} \gamma^x(n) + \gamma^x(1) \quad (61)$$

where $$\gamma^x(n) = \arg\{E[A_v^x(n-1)A_v^x(n)^*]\} \quad (62)$$

A similar formulation holds for the y-polarized transmission. The combined "relative channel state information" is then given by:

$$\tilde{J}^x(k) = [\hat{\Upsilon}_{rel}^x(k) \ \hat{\Upsilon}_{rel}^y(k)] \quad (63)$$
$$= \begin{bmatrix} \sqrt{\overline{C}_{11}^x(k)}\, e^{j\phi^x(k)} & \sqrt{\overline{C}_{11}^y(k)}\, e^{j\phi^y(k)} \\ \sqrt{\overline{C}_{21}^x(k)}\, e^{j(\angle \overline{C}_{21}^x(k)+\phi^x(k))} & \sqrt{\overline{C}_{21}^y(k)}\, e^{j(\angle \overline{C}_{21}^y(k)+\phi^y(k))} \end{bmatrix}$$

where the $\phi^x$ and $\phi^y$ must be derived from a common phase reference to achieve fully-coherent Jones matrix elements. Once determined, the response for any transmit polarization and any frequency can be obtained from the combined estimated response:

$$\hat{S}^{comb}(k) = A(\underline{\Upsilon}^{rel}(k) \otimes (\underline{\Upsilon}^{rel}(k))^*). \quad (64)$$

where $$\underline{\Upsilon}^{rel}(k) = \rho_x^{in} \underline{\Upsilon}_{rel}^x(k) + \rho_y^{in} \underline{\Upsilon}_{rel}^y(k) \quad (65)$$

Such a method is illustrated in the experimental results, where distinct transmit polarization states are interleaved on a transmitted OFDM symbol.

III. Experimental Validation

Experiments were conducted to validate the modeling approaches considered in this work. The experiments employed orthogonal dual-polarized transmit and receive antennas along with a separable transmit waveform. Separable refers to the capability of separating the transmit signals at the receiver.

The purpose was to demonstrate the feasibility of calculating the frequency-dependent Jones matrix in a multipath environment where significant polarization mode dispersion (PMD) is present. Using the calculated Jones matrix, we demonstrate the ability to calculate the frequency-dependent received signal polarization for an arbitrary transmit polarization. The experiment employed a dual-polarized antenna (with horizontal (H) and vertical (V) elements sharing a common phase center) at both the transmitter and the receiver. The transmit and receive antennas were separated by approximately 20 feet, and the signal was transmitted at a carrier frequency of 2.512 GHz.

A. Transmit Waveform

By using a separable transmit waveform, it is possible to process the receive signal in order to separate the channel response for each of the two transmit antenna ports (H and V). This permits the calculation of each of the 4 Jones matrix elements (HH, HV, VH, and VV). There are several ways to design such a separable waveform (e.g., using time multiplexing or frequency multiplexing). We employed frequency multiplexing where H and V polarizations were transmitted on different, interleaved frequencies within the overall signal bandwidth. The waveform also included two additional interleaved polarizations, slant-45 (S-45) and righthand circular (RHC), formed with linear combinations of the V and H transmit signals, so that the signal received from these additional polarizations could be compared to the estimates produced using the Jones matrices calculated from the H and V transmissions, proving the ability to characterize the SOP versus frequency for arbitrary transmit polarizations. Table I summarizes parameters associated with the transmit waveform.

TABLE I

Transmit Signal Parameters

| Parameter | Description |
|---|---|
| number of tones | 400 |
| tone separation | 50 kHz |
| signal bandwidth | 20 MHz |
| Interleaved Polarizations | V, H, S-45 and RHC |
| Tone signal amplitudes | identical |
| Phase randomization | Each group of 4 adjacent tones has the same random phase |

FIG. 6 (Illustration of multi-tone waveform with inter-leaved polarizations) shows a portion of the frequency spectrum with the polarization-interleaved tones, where the V, H, S-45, and RCH polarization states are applied across the tones in an interleaved fashion.

B. Measurements with a Cabled Set-Up

Initially, we connected the transmitter and receiver with cables to verify the system's ability to measure absolute polarization states. FIG. 8 (Receive signal polarization for cabled connection between Tx and Rx (no antennas)) shows the received signal SOP on the Poincare sphere for each of the interleaved tones. For this case, which does not includes multipath and thus negligible PMD, the four received signal polarizations are approximately equivalent to the four transmit signal polarizations, as expected. The results indicate a slight gain and phase mismatch in the overall system response.

C. Measurements Over a Wireless Channel

When the cables are removed, and dual-polarized antennas are employed, the received signal polarization response due to each of the interleaved transmit polarization states is shown in FIG. 7 (receive signal polarization for transmit signal with four discrete (interleaved) transmit polarizations). The identifiers 1-4 in the figure represent the received signal for transmit polarizations vertical (V), horizontal (H), slant-45 (S-45), and right-hand circular (RHC), respectively. The points in each curve correspond to frequency subcarriers where the progression spans the baseband signal bandwidth from −10 to +10 MHz. The circles on the sphere designate the received signal polarizations H and V, respectively, while the top pole on the sphere represents RHC. Note that the output SOP depends both on the subcarrier frequency and also on the transmit SOP. The responses contain evidence of circular rotation, and in some cases (1 and 3) are close to pure rotations about a single origin.

Each of the responses in FIG. 7 show substantial PMD, that is, a spreading in the polarization with frequency. Also note that the mean received signal polarization for a curve is not always similar to its transmit polarization. For example, the mean received signal polarization for V transmission (identified by "1" in the figure) is closer to RHC than it is to V. The mean received signal polarization for RHC transmission (identified by "4") is nearly linear and close S-45.

D. Linear Combination Verification

It is possible to use the V and H transmissions to calculate frequency-dependent Jones matrices to fully characterize the system SOP response. This requires phase coherent transmission among the separable transmit signals, and coherent reception to preserve the relative phase response among all of the sub-channels (VV, VH, HV, and HH). The resulting frequency-dependent matrices can then be used to estimate the received SOP for any transmit polarization on any of the subcarriers. To illustrate the efficacy of the approach, we consider the estimated and measured responses first for S-45 and then for RHC transmissions across all subcarriers. FIG. 9 (receive signal polarization for S-45 (actual versus estimate)) and FIG. 10 (receive signal polarization for RHC (actual versus estimate)) show comparisons of the actual signal received for transmit signal polarizations S-45 and RHC with the corresponding estimates produced using the Jones matrices formed from the H and V receptions. The identifier "1" in the figures represents the actual receive polarization while the identifier "2" represents the polarization estimated from the Jones matrix calculations. Note that in both figures, the actual and estimated polarizations are nearly equal across the full signal bandwidth, demonstrating the desired capability to characterize the system response for arbitrary transmit SOP and subcarrier frequency.

What is claimed is:

1. A method comprising:
    coherently synthesizing a first plurality of transmit signals with a transmitter phase reference, the first plurality of transmit signals having a separability characteristic which permits them to be differentiated from one another;
    coherently transmitting the first plurality of transmit signals using a multi-port transmitter and the transmitter phase reference;
    coherently receiving one or more receiver signals using a receiver with a receiver phase reference, the one or more receiver signals comprising one or more combinations of received versions of the first plurality of transmit signals;
    using the separability characteristic to determine the received versions of the first plurality of transmit signals from the one or more receiver signals; and
    determining, using the receiver, an estimated signal corresponding to an estimated receiver response to a second plurality of virtual transmit signals which comprise a combination of the first plurality of transmit signals, wherein determining the estimated signal comprises forming a combination of the received versions of the first plurality of transmit signals.

2. The method of claim 1, wherein the first plurality of transmit signals have one or more relative amplitude and phase differences which correspond to a first polarization state or a first beam state, and wherein the second plurality of virtual transmit signals are associated with a different second polarization state or a different second beam state.

3. The method of claim 1, wherein the first plurality of transmit signals are transmitted via a respective plurality of transmitter antenna elements, or wherein the first plurality of transmit signals are respectively transmitted as a plurality of beams each transmitted using multiple transmitter antenna elements, or wherein the first plurality of transmit signals are transmitted via a combination of beams and individual antenna elements.

4. The method of claim 1, wherein the one or more receiver signals comprise a single receiver signal received via a single receiver antenna element, or wherein the one or more receiver signals comprise a plurality of receiver signals received via a respective plurality of receiver antenna elements, or wherein the one or more receiver signals comprise a plurality of receiver signals which are respectively received as a plurality of beams each received using a plurality of receiver antenna elements.

5. The method of claim 1, wherein the combination comprises a linear combination.

6. The method of claim 5, wherein the linear combination comprises a complex weighted linear combination.

7. The method of claim 6, wherein forming the complex weighted linear combination comprises selecting complex weights which cause the estimated signal to satisfy a selected criterion.

8. The method of claim 7, wherein the criterion comprises:
    that a signal power of the estimated signal is greater than that of one or more of the receiver signals;
    that a signal power of the estimated signal is less than that of one or more of the receiver signals;
    that the estimated signal has a selected polarization state or a selected polarization mode dispersion profile; or
    that the estimated signal has a selected coherence state or a selected coherence dispersion profile.

9. The method of claim 1, wherein forming the combination of the received versions of the first plurality of transmit signals is performed on a frequency sub-band-by-sub-band basis.

10. The method of claim 9, wherein different combining weights are used for different frequency sub-bands.

11. The method of claim 1, further comprising forming a combination of the receiver signals.

12. The method of claim 1, wherein the second plurality of virtual transmit signals comprise a complex weighted linear combination of the first plurality of transmit signals.

13. The method of claim 1, wherein the separability characteristic comprises time multiplexing, frequency multiplexing, code multiplexing, beam multiplexing, or eigenmode multiplexing.

14. The method of claim 1, wherein the transmitter phase reference and the receiver phase reference are coherent.

15. The method of claim 14, wherein the first plurality of transmit signals are synthesized from a common transmit waveform, the first plurality of transmit signals having one or more relative amplitude, phase, time delay, frequency offset, or transmission beam differences with respect to one another.

16. The method of claim 1, wherein the first plurality of transmit signals are transmitted using orthogonally-polarized antenna elements.

17. The method of claim 1, wherein the first plurality of transmit signals are transmitted using spatially-separated antenna elements.

18. The method of claim 1, wherein the receiver signals are received using orthogonally-polarized antenna elements.

19. The method of claim 1, wherein the receiver signals are received using spatially-separated antenna elements.

20. A system comprising:
a multi-port transmitter configured to coherently synthesize and transmit a first plurality of transmit signals using a transmitter phase reference, the plurality of transmit signals having a separability characteristic which permits them to be differentiated from one another; and
a receiver configured to:
coherently receive one or more receiver signals using a receiver phase reference;
determine received versions of the first plurality of transmit signals from the one or more receiver signals using the separability characteristic; and
determine an estimated signal corresponding to an estimated receiver response to a second plurality of virtual transmit signals which comprise a combination of the first plurality of transmit signals, wherein determining the estimated signal comprises forming a combination of the received versions of the first plurality of transmit signals.

21. The system of claim 20, wherein the transmitter and the receiver are co-located.

22. A receiver comprising:
one or more input ports to coherently receive one or more receiver signals using a receiver phase reference, the one or more receiver signals including receiver responses to a first plurality of transmit signals from a transmitter, the first plurality of transmit signals having a separability characteristic which permits them to be differentiated from one another; and
a signal processor configured to:
determine received versions of the first plurality of transmit signals from the one or more receiver signals using the separability characteristic; and
determine an estimated signal corresponding to an estimated receiver response to a second plurality of virtual transmit signals which comprise a combination of the first plurality of transmit signals, wherein determining the estimated signal comprises forming a combination of the received versions of the first plurality of transmit signals.

23. The receiver of claim 22, wherein the first plurality of transmit signals have one or more relative amplitude and phase differences which correspond to a first polarization state or a first beam state, and wherein the second plurality of virtual transmit signals are associated with a different second polarization state or a different second beam state.

24. The receiver of claim 22, wherein the one or more receiver signals comprise a single receiver signal received via a single receiver antenna element, or wherein the one or more receiver signals comprise a plurality of receiver signals received via a respective plurality of receiver antenna elements, or wherein the one or more receiver signals comprise a plurality of receiver signals which are respectively received as a plurality of beams each received using a plurality of receiver antenna elements.

25. The receiver of claim 22, wherein the combination comprises a linear combination.

26. The receiver of claim 25, wherein the linear combination comprises a complex weighted linear combination.

27. The receiver of claim 26, wherein the signal processor is configured to form the complex weighted linear combination by selecting complex weights which cause the estimated signal to satisfy a selected criterion.

28. The receiver of claim 27, wherein the criterion comprises:
that a signal power of the estimated signal is greater than that of one or more of the receiver signals;
that a signal power of the estimated signal is less than that of one or more of the receiver signals;
that the estimated signal has a selected polarization state or a selected polarization mode dispersion profile; or
that the estimated signal has a selected coherence state or a selected coherence dispersion profile.

29. The receiver of claim 22, wherein the signal processor is configured to form the combination of the received versions of the first plurality of transmit signals on a frequency sub-band-by-sub-band basis.

30. The receiver of claim 29, wherein the signal processor is configured to use different combining weights for different frequency sub-bands.

31. The receiver of claim 22, wherein the signal processor is further configured to form a combination of the receiver signals.

32. The receiver of claim 22, wherein the second plurality of virtual transmit signals comprise a complex weighted linear combination of the first plurality of transmit signals.

33. The receiver of claim 22, wherein the separability characteristic comprises time multiplexing, frequency multiplexing, code multiplexing, beam multiplexing, or eigenmode multiplexing.

34. The receiver of claim 22, wherein the receiver signals are received using orthogonally-polarized antenna elements.

35. The receiver of claim 22, wherein the receiver signals are received using spatially-separated antenna elements.

* * * * *